(12) United States Patent
Wang et al.

(10) Patent No.: US 12,160,000 B2
(45) Date of Patent: Dec. 3, 2024

(54) ELECTROCHEMICAL DEVICE AND ELECTRONIC DEVICE INCLUDING SAME

(71) Applicant: NINGDE AMPEREX TECHNOLOGY LIMITED, Ningde (CN)

(72) Inventors: Kefei Wang, Ningde (CN); Qingwen Zhang, Ningde (CN); Zhen Dai, Ningde (CN); Yingying Wang, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 307 days.

(21) Appl. No.: 17/056,073

(22) PCT Filed: Dec. 25, 2019

(86) PCT No.: PCT/CN2019/128442
§ 371 (c)(1),
(2) Date: Nov. 17, 2020

(87) PCT Pub. No.: WO2021/128092
PCT Pub. Date: Jul. 1, 2021

(65) Prior Publication Data
US 2021/0376328 A1    Dec. 2, 2021

(51) Int. Cl.
H01M 4/62       (2006.01)
H01M 4/133      (2010.01)
H01M 4/36       (2006.01)
H01M 4/587      (2010.01)
H01M 4/02       (2006.01)

(52) U.S. Cl.
CPC ........... H01M 4/622 (2013.01); H01M 4/133 (2013.01); H01M 4/364 (2013.01); H01M 4/587 (2013.01); H01M 2004/027 (2013.01)

(58) Field of Classification Search
CPC ...... H01M 4/622; H01M 4/133; H01M 4/364; H01M 4/587; H01M 2004/027
See application file for complete search history.

(56) References Cited

U.S. PATENT DOCUMENTS

| | | | | |
|---|---|---|---|---|
| 5,256,504 A * | 10/1993 | Okuno | ............... | H01M 4/0404 |
| | | | | 429/231.95 |
| 5,773,167 A * | 6/1998 | Iwasaki | ............... | H01M 4/587 |
| | | | | 429/231.8 |
| 2006/0063073 A1 * | 3/2006 | Kawashima | ............ | H01M 4/62 |
| | | | | 429/246 |
| 2009/0286155 A1 * | 11/2009 | Takehara | ........... | H01M 10/0569 |
| | | | | 429/199 |
| 2010/0028786 A1 * | 2/2010 | Takahashi | ......... | H01M 10/0567 |
| | | | | 429/247 |
| 2011/0319581 A1 * | 12/2011 | Yamaguchi | .......... | C09D 171/00 |
| | | | | 526/247 |
| 2016/0359196 A1 * | 12/2016 | Kim | .................. | H01M 10/0567 |
| 2017/0162905 A1 * | 6/2017 | Lee | ....................... | H01M 4/485 |
| 2020/0014020 A1 * | 1/2020 | Lee | ....................... | H01M 4/661 |

FOREIGN PATENT DOCUMENTS

| | | | | |
|---|---|---|---|---|
| CA | 2839215 A1 * | 7/2014 | ............ | H01M 4/133 |
| CN | 1545742 A | 11/2004 | | |
| CN | 1739208 A | 2/2006 | | |
| CN | 102593438 A | 7/2012 | | |
| CN | 104781976 A | 7/2015 | | |
| CN | 106058317 A | 10/2016 | | |
| CN | 106099171 A | 11/2016 | | |
| CN | 106252710 A | 12/2016 | | |
| CN | 106654171 A | 5/2017 | | |
| CN | 106848202 A | 6/2017 | | |
| CN | 109980225 A | 7/2019 | | |
| CN | 110165219 A | 8/2019 | | |
| JP | 05074487 A | 3/1993 | | |
| JP | 2000090935 A | 3/2000 | | |
| JP | 2001118578 A | 4/2001 | | |
| JP | 2004179146 A | 6/2004 | | |
| JP | 2007173222 A | 7/2007 | | |
| JP | 2011166044 A | 8/2011 | | |
| JP | 2014060148 A | 4/2014 | | |
| JP | 2016039087 A | 3/2016 | | |
| JP | 2017130399 A | 7/2017 | | |
| JP | 2019507460 A | 3/2019 | | |
| KR | 20160144123 A | 12/2016 | | |
| KR | 20180036340 A | 4/2018 | | |
| KR | 201800363340 A | 4/2018 | | |

(Continued)

OTHER PUBLICATIONS

Ariati, R., Sales, F., Souza, A., Lima, R. A., & Ribeiro, J. (2021). Polymers, 13(23), 4258 (Year: 2021).*
Tan, J., He, Z., Miao, Y., & Lin, M. (2019). Journal of Surfactants and Detergents, 22(4), 875-883 (Year: 2019).*
Elcora, "Anode Powder" https://www.elcoracorp.com/anode-powder/, published Apr. 25, 2018. Retrieved via the Wayback Machine (Year: 2018).*
Antartis (Antartis, Dimitrios, Shen Dillon, and Ioannis Chasiotis. Journal of Composite Materials 49.15 (2015): 1849-1862), (Year: 2015).*

(Continued)

Primary Examiner — Milton I Cano
Assistant Examiner — Albert Michael Hilton
(74) Attorney, Agent, or Firm — XSENSUS LLP

(57) ABSTRACT

An electrochemical device, including a cathode; an anode; and an electrolyte. The anode has an anode mixture layer on an anode current collector, the anode mixture layer includes a carbon material as an anode active material, and at least a part of a surface of the anode mixture layer or a surface of the carbon material comprises a polymer compound having Si—C and Si—O bonds. The electrochemical device has improved cycle performance and storage performance.

10 Claims, No Drawings

(56) References Cited

FOREIGN PATENT DOCUMENTS

| | | |
|---|---|---|
| WO | 2018116879 A1 | 6/2018 |
| WO | 2018169290 A2 | 9/2018 |
| WO | 2018221929 A1 | 12/2018 |

OTHER PUBLICATIONS

"Processing Technology and Equipment for Non-metallic Ore," Zheng et al., published by China Building Materials X Industry Press (Jun. 30, 1998), 2 pages in Chinese and 1 page English abstract.

New Energy Materials, 2nd Edition, by Qisheng Wu, published by East China University of Science and Technology, publication date Jun. 30, 2017, 1 page English abstract.

Request for the Submission of an Opinion mailed Aug. 8, 2024, in Korean Application No. 10-2022-7009416, 23 pages. (With English Translation).

\* cited by examiner

ELECTROCHEMICAL DEVICE AND ELECTRONIC DEVICE INCLUDING SAME

CROSS REFERENCE TO THE RELATED APPLICATION

The present application is a National Stage application of PCT international application PCT/CN2019/128442, filed on 25 Dec. 2019, the entire content of which is incorporated herein with reference.

BACKGROUND

1. Technical Field

The present application relates to the field of energy storage technologies, in particular to an electrochemical device and an electronic device including the same, and more particularly to a lithium-ion battery.

2. Description of the Related Art

With the development of technologies and the increasing demand for mobile devices, the demand for electrochemical devices (e.g., lithium-ion batteries) has increased significantly. Lithium-ion batteries with high energy density and excellent service life and cycle performance are one research direction.

The theoretical capacity of a lithium-ion battery may vary with the type of the anode active material. As cycles progress, lithium-ion batteries generally have a decrease in charge/discharge capacity, causing the deterioration in performance of the lithium-ion batteries. In recent years, in the manufacture of lithium-ion batteries, in order to reduce environmental impact and the like, aqueous slurry compositions using an aqueous medium as a dispersion medium have received more and more attention, but aqueous slurries may have defects such as the formation of multiple pinholes and pits in the active material layer due to the presence of bubbles in the slurry composition, affecting the cycling and high-temperature storage performance of the electrochemical device.

In view of this, it is indeed necessary to provide an improved electrochemical device having a high-power feature and high safety performance and an electronic device including the same.

SUMMARY

The embodiments of the present application provide an electrochemical device and an electronic device including the same to resolve at least one of the problems in the related art.

According to an aspect of the present application, the present application provides an electrochemical device including a cathode; an anode; and an electrolyte, wherein the anode includes an anode mixture layer disposed on an anode current collector, the anode mixture layer includes a carbon material as an anode active material, and at least a part of a surface of the anode mixture layer or a surface of the carbon material includes a polymer compound having Si—C and Si—O bonds.

According to some embodiments of the present application, the polymer compound having Si—C and Si—O bonds has at least one of the following characteristics:

(a) includes polyether siloxane;
(b) an oxidation potential of not less than 4.5 V and a reductive potential of not greater than 0.5 V; or
(c) a surface tension of an aqueous solution containing 0.1 wt % of the polymer compound having Si—C and Si—O bonds being not greater than 30 mN/m.

According to some embodiments of the present application, based on a total weight of the anode mixture layer, a content of the polymer compound having Si—C and Si—O bonds is less than or equal to 3000 ppm.

According to some embodiments of the present application, the carbon material has at least one of the following characteristics:

(a) a specific surface area of less than 5 $m^2/g$;
(b) a median particle size of 5 μm to 30 μm;
(c) amorphous carbon on a surface.

According to some embodiments of the present application, the anode mixture layer has at least one of the following characteristics:

(a) a thickness of not greater than 200 μm;
(b) a porosity of 10% to 60%;
(c) a minimum height from which a ball having a diameter of 15 mm and a weight of 12 g falls onto the anode mixture layer to cause formation of cracks on the anode mixture layer being at least 50 cm.

According to some embodiments of the present application, the electrolyte includes at least one of the following compounds:

(a) propionate;
(b) an organic compound having a cyano group(s); or
(c) lithium difluorophosphate; or
(d) a compound of Formula 1:

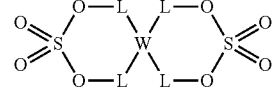

Formula 1 wherein
W is selected from

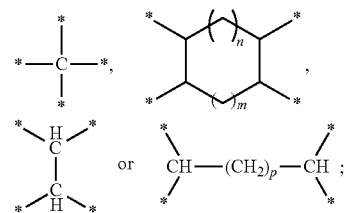

L is selected from a single bond or methylene;
m is an integer from 1 to 4;
n is an integer from 0 to 2; and
p is an integer from 0 to 6.

According to some embodiments of the present application, the electrolyte includes the compound of Formula 1, and the compound of Formula 1 is at least one selected from the following:

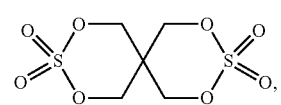

Formula 1-1

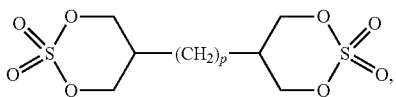
Formula 1-2

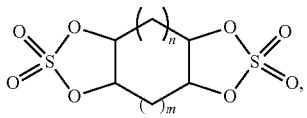
Formula 1-3

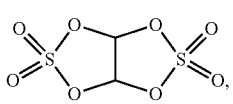
Formula 1-4

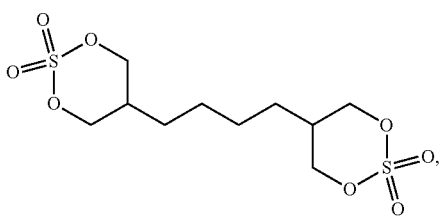
Formula 1-5

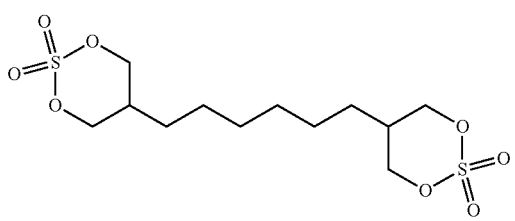
or Formula 1-6

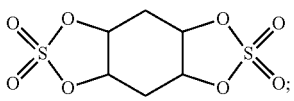
Formula 1-7 m is an integer from 1 to 4;
n is an integer from 0 to 2; and
p is an integer from 0 to 6.

According to some embodiments of the present application, the electrolyte includes propionate, and the propionate has a structure of Formula 2:

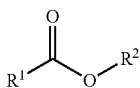
Formula 2 wherein
$R^1$ is selected from ethyl or haloethyl, and
$R^2$ is selected from $C_1$-$C_6$ alkyl or $C_1$-$C_6$ haloalkyl; and
based on the weight of the electrolyte, a content of the propionate is 10 wt %-65 wt %.

According to some embodiments of the present application, the propionate is selected from at least one of: methyl propionate, ethyl propionate, propyl propionate, butyl propionate, or amyl propionate.

According to some embodiments of the present application, the organic compound having a cyano group(s) is at least one selected from the group consisting of succinonitrile, glutaronitrile, adiponitrile, 1,5-dicyanopentane, 1,6-dicyanohexane, tetramethyl succinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile)ether, 3,5-dioxa-pimelonitrile, 1,4-bis(cyanoethoxy)butane, diethylene glycol bis(2-cyanoethyl) ether, triethylene glycol bis(2-cyanoethyl) ether, tetraethylene glycol bis(2-cyanoethyl) ether, 1,3-bis(2-cyanoethoxy)propane, 1,4-bis(2-cyanoethoxy)butane, 1,5-bis(2-cyanoethoxy)pentane, ethylene glycol bis(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane and 1,2,5-tris(cyanoethoxy)pentane; and based on a total weight of the electrolyte, a content of the organic compound having a cyano group is 0.1 wt % to 15 wt %.

According to another aspect of the present application, the present application provides an electronic device including the electrochemical device according to the present application.

Additional aspects and advantages of the embodiments of the present application will be described or shown in the following description or interpreted by implementing the embodiments of the present application.

DETAILED DESCRIPTION

The embodiments of the present application will be described in detail below. The embodiments of the present application should not be interpreted as limitations to the present application.

Unless otherwise expressly indicated, the following terms used herein have the meanings indicated below.

In specific embodiments and claims of the present application, a list of items connected by the term "at least one of" or other similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. Item A may include a single or multiple elements. Item B may include a single or multiple elements. Item C may include a single or multiple elements. The term "at least one of" has the same meaning as the term "at least one kind of".

As used herein, the term "alkyl group" is intended to be a linear saturated hydrocarbon structure having 1 to 20 carbon atoms. The "alkyl" is also expected to be a branched chain or cyclic hydrocarbon structure having 3 to 20 carbon atoms. When an alkyl group having a specific number of carbon atoms is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on.

As used herein, the term "halogenation" refers to the replacement of a hydrogen atom by a stable atom belonging to Group 17 of the periodic table of the elements, such as fluorine, chlorine, bromine, or iodine.

The theoretical capacity of an electrochemical device (e.g., a lithium-ion battery) may vary with the type of the anode active material. As cycles progress, the electrochemical device generally has a decrease in charge/discharge capacity. This is because the electrode interface of the electrochemical device changes during charging and discharging, resulting in that the electrode active material cannot perform its functions.

In the present application, the use of the combination of the particular anode material and the particular electrolyte ensures the interface stability of the electrochemical device during the cycles, thereby improving the cycle performance and high-temperature storage performance of the electrochemical device.

In one embodiment, the present application provides an electrochemical device, including a cathode, an anode and an electrolyte as described below.

I. Anode

The anode includes an anode current collector and an anode mixture layer disposed on one or two surfaces of the anode current collector.

1. Anode Mixture Layer

The anode mixture layer includes an anode active material layer, and the anode active material layer includes an anode active material. There may be one or more anode mixture layers, and each of the plurality of layers of anode active materials may include the same or different anode active materials. The anode active material is any substance capable of reversibly intercalating and deintercalating metal ions such as lithium ions. In some embodiments, the chargeable capacity of the anode active material is greater than the discharge capacity of the cathode active material to prevent lithium metal from unintentionally precipitating on the anode during charging.

(1) Polymer Compound Having Si—C and Si—O Bonds

One of the main characteristics of the electrochemical device of the present application lies in that the anode mixture layer includes a carbon material as an anode active material, and at least a part of the surface of the anode mixture layer or the surface of the carbon material includes a polymer compound having Si—C and Si—O bonds.

The polymer compound having Si—C and Si—O bonds disposed on at least a part of the surface of the anode mixture layer or the surface of the anode active material (carbon material) can improve the interface stability of the anode mixture layer, thereby effectively improving the cycle performance and storage performance of the electrochemical device.

The bonding state of elements in the anode mixture layer can be detected by X-ray photoelectron spectroscopy (XPS). In XPS, in the apparatus in which energy calibration is made so that the peak of 4f orbit of gold atom (Au4f) is obtained in 84.0 eV, the peaks of 2p orbit of silicon bonded with oxygen (Si2p1/2Si—O and Si2p3/2Si—O) are observed in 104.0 eV (Si2p1/2Si—O) and 103.4 eV (Si2p3/2Si—O), and the peaks of 2p orbit of silicon bonded with carbon (Si2p1/2Si—C and Si2p3/2Si—C) are respectively observed in regions lower than the 2p orbit of silicon bonded with oxygen (Si2p1/2Si—O and Si2p3/2Si—O).

According to some embodiments of the present application, the polymer compound having Si—C and Si—O bonds has at least one of the following characteristics:

(a) includes polyether siloxane;

(b) an oxidation potential of not less than 4.5 V and a reductive potential of not greater than 0.5 V;

(c) a surface tension of an aqueous solution containing 0.1 wt % of the polymer compound having Si—C and Si—O bonds being not greater than 30 mN/m. In some embodiments, the polymer compound having Si—C and Si—O bonds includes polyether siloxane.

Polyether Siloxane

In some embodiments, the polymer compound having Si—C and Si—O bonds includes polyether siloxane. In some embodiments, the polyether siloxane includes at least one of a composite silicone polyether complex, a polyether modified trisiloxane, or a polyether modified silicone polyether siloxane.

Examples of polyether siloxane include, but are not limited to, trisiloxane surfactant (CAS No.3390-61-2; 28855-11-0), silicone surfactant (Sylgard 309), hydroxy-terminated polydimethylsiloxane (PMX-0156) or dimethicone (CAS No.63148-62-9).

The polyether siloxane may be used alone or in any combination. When the polymer compound having Si—C and Si—O bonds includes two or more polyether siloxanes, the content of the polyether siloxane means the total content of the two or more polyether siloxanes. In some embodiments, based on the total weight of the anode mixture layer, the content of the polyether siloxane is 3000 ppm or below, 2000 ppm or below, 1000 ppm or below, 500 ppm or below, 300 ppm or below, or 200 ppm or below. When the content of the polyether siloxane falls within the above ranges, performance such as the output power characteristics, load characteristics, low-temperature characteristics, cycle characteristics and high-temperature storage characteristics of the electrochemical device can be improved.

Oxidation/Reductive Potential

In some embodiments, the polymer compound having Si—C and Si—O bonds has an oxidation potential of not less than 4.5 V and a reductive potential of not greater than 0.5 V. In some embodiments, the polymer compound having Si—C and Si—O bonds has an oxidation potential of not less than 5 V and a reductive potential of not greater than 0.3 V. With the above oxidation/reductive potential, the polymer compound having Si—C and Si—O bonds has stable performance, which helps to improve the cycle performance and high-temperature storage performance of the electrochemical device.

Surface Tension

In some embodiments, the surface tension of an aqueous solution containing 0.1 wt % of the polymer compound having Si—C and Si—O bonds is not greater than 30 mN/m. In some embodiments, the surface tension of an aqueous solution containing 0.1 wt % of the polymer compound having Si—C and Si—O bonds is not greater than 25 mN/m. In some embodiments, the surface tension of an aqueous solution containing 0.1 wt % of the polymer compound having Si—C and Si—O bonds is not greater than 20 mN/m. In some embodiments, the surface tension of an aqueous solution containing 0.1 wt % of the polymer compound having Si—C and Si—O bonds is not greater than 15 mN/m. In some embodiments, the surface tension of an aqueous solution containing 0.1 wt % of the polymer compound having Si—C and Si—O bonds is not greater than 10 mN/m. With the above surface tension, the polymer compound having Si—C and Si—O bonds provides the anode mixture layer with a good interface, which helps to improve the cycle performance and high-temperature storage performance of the electrochemical device.

The surface tension of the polymer compound having Si—C and Si—O bonds can be measured by using the following method: testing an aqueous solution, which has a solid content of 0.1%, of the polymer compound having Si—C and Si—O bonds by using a JC2000D3E contact angle goniometer, where each sample is tested at least three times, at least three pieces of data are selected, and an average value is calculated, thus obtaining the surface tension of the polymer compound having Si—C and Si—O bonds.

According to some embodiments of the present application, based on the total weight of the anode mixture layer, the content of the polymer compound having Si—C and Si—O bonds is 3000 ppm or below. In some embodiments, based on the total weight of the anode mixture layer, the content of the polymer compound having Si—C and Si—O bonds is 2500 ppm or below. In some embodiments, based on the total weight of the anode mixture layer, the content of the polymer compound having Si—C and Si—O bonds is 2000 ppm or below. In some embodiments, based on the total weight of the anode mixture layer, the content of the polymer compound having Si—C and Si—O bonds is 1500 ppm or below. In some embodiments, based on the total weight of the anode mixture layer, the content of the polymer compound having Si—C and Si—O bonds is 1000 ppm or below. In some embodiments, based on the total weight of the anode mixture layer, the content of the polymer compound having Si—C and Si—O bonds is 500 ppm or below.

(2) Carbon Material

According to some embodiments of the present application, the carbon material includes at least one of artificial graphite, natural graphite, mesocarbon microbead (MCMB), soft carbon, hard carbon, and amorphous carbon.

According to some embodiments of the present application, the shape of the carbon material includes, but is not limited to, being fibrous, spherical, granular, and scaly.

According to some embodiments of the present application, the carbon material has at least one of the following characteristics:
  (a) a specific surface area (BET) of less than 5 $m^2/g$;
  (b) a median particle size (D50) of 5 μm to 30 μm;
  (c) amorphous carbon on a surface.

Specific Surface Area (BET)

In some embodiments, the carbon material has a specific surface area of less than 5 $m^2/g$. In some embodiments, the carbon material has a specific surface area of less than 3 $m^2/g$. In some embodiments, the carbon material has a specific surface area of less than 1 $m^2/g$. In some embodiments, the carbon material has a specific surface area of greater than 0.1 $m^2/g$. In some embodiments, the carbon material has a specific surface area of less than 0.7 $m^2/g$. In some embodiments, the carbon material has a specific surface area of less than 0.5 $m^2/g$. In some embodiments, the specific surface area of the carbon material is in a range defined by any two of the above values. When the specific surface area of the carbon material falls within the above ranges, precipitation of lithium on the electrode surface can be suppressed, and the generation of gases due to the reaction of the anode with the electrolyte can also be suppressed.

The specific surface area (BET) of the carbon material may be measured by using the following method: measuring the specific surface area by using a surface area meter (fully automatic surface area measuring instrument manufactured by Okura Riken), where the test sample is preliminarily dried at 350° C. for 15 minutes while circulating nitrogen, and the specific surface area is then measured by a nitrogen adsorption BET single-point method utilizing a gas flow method using a nitrogen-helium mixed gas of which the relative pressure of nitrogen with respect to the atmospheric pressure is accurately adjusted to 0.3.

Median Particle Size (D50)

The median particle size (D50) of the carbon material is a volume-based average particle size obtained using a laser diffraction/scattering method. In some embodiments, the carbon material has a median particle size (D50) of 5 μm to 30 μm. In some embodiments, the carbon material has a median particle size (D50) of 10 μm to 25 μm. In some embodiments, the carbon material has a median particle size (D50) of 15 μm to 20 μm. In some embodiments, the carbon material has a median particle size (D50) of 1 μm, 3 μm, 5 μm, 7 μm, 10 μm, 15 μm, 20 μm, 25 μm, or 30 μm or in a range defined by any two of these values. When the median particle size of the carbon material falls within the above ranges, the irreversible capacity of the electrochemical device is low, and the anode can be easily evenly coated.

The median particle size (D50) of the carbon material may be measured by using the following method: dispersing the carbon material in a 0.2 wt % aqueous solution (10 mL) of poly(oxyethylene(20)) sorbitan monolaurate, and testing with a laser diffraction/scattering particle size distribution analyzer (LA-700 manufactured by Horiba, Ltd)

X-Ray Diffraction Pattern Parameters:

According to some embodiments of the present application, based on X-ray diffraction patterns obtained using the Gakushin method, the interlayer spacing of the lattice plane (002 plane) of the carbon material is in the range of 0.335 nm to 0.360 nm, in the range of 0.335 nm to 0.350 nm or in the range of 0.335 nm to 0.345 nm.

According to some embodiments of the present application, based on X-ray diffraction patterns obtained using the Gakushin method, the crystallite size (Lc) of the carbon material is greater than 1.0 nm or greater than 1.5 nm.

Raman Spectrum Parameters

In some embodiments, the Raman R value of the carbon material is greater than 0.01, greater than 0.03 or greater than 0.1 In some embodiments, the Raman R value of the carbon material is less than 1.5, less than 1.2, less than 1.0 or less than 0.5. In some embodiments, the Raman R value of the carbon material is in a range defined by any two of the above values.

The full-width-at-half maximum of the Raman peak at around 1580 $cm^{-1}$ of the carbon material is not particularly limited. In some embodiments, the full-width-at-half maximum of the Raman peak at around 1580 $cm^{-1}$ of the carbon material is greater than 10 $cm^{-1}$ or greater than 15 $cm^{-1}$. In some embodiments, the full-width-at-half maximum of the Raman peak at around 1580 $cm^{-1}$ of the carbon material is less than 100 $cm^{-1}$, less than 80 $cm^{-1}$, less than 60 $cm^{-1}$ or less than 40 $cm^{-1}$. In some embodiments, the full-width-at-half maximum of the Raman peak at around 1580 $cm^{-1}$ of the carbon material is in a range defined by any two of the above values.

The Raman R value and the full-width-at-half maximum of the Raman peak are indicators of the crystallinity of the surface of the carbon material. With suitable crystallinity, interlayer sites accommodating lithium in the carbon material during charging and discharging can be maintained and will not disappear, thereby improving the chemical stability of the carbon material. When the Raman R value and/or the full-width-at-half maximum of the Raman peak falls within the above ranges, the carbon material can form an appropriate covering on the surface of the anode, thereby improving the storage characteristics, cycle characteristics, load characteristics and the like of the electrochemical device, and suppressing the reduction in efficiency and formation of gases due to the reaction of the carbon material with the electrolyte.

The Raman R value or the full-width-at-half maximum of the Raman peak may be measured using argon-ion laser Raman spectroscopy: using a Raman spectroscope (manufactured by JASCO Corporation), where the test sample is caused to naturally fall and fill the measuring cell, the surface of the test sample in the cell is irradiated with an argon ion laser, and the cell is rotated in a plane perpendicular to the laser, thus implementing the measurement. For the Raman spectrum obtained, an intensity IA of the peak PA at around 1580 $cm^{-1}$ and an intensity IB of the peak PB at around 1360 $cm^{-1}$ are measured, and an intensity ratio R is calculated (R=IB/IA).

Measurement conditions of the above Raman spectroscopy are as follows:
Wavelength of argon ion laser: 514.5 nm
Laser power on the test sample: 15-25 mW
Resolution: 10-20 $cm^{-1}$
Measurement range: 1100 $cm^{-1}$-1730 $cm^{-1}$
Analysis of Raman R value and full-width-at-half maximum of the Raman peak: background processing
Smoothing: simple average, 5-point convolution Circularity The definition of "circularity" is as follows: circularity=(perimeter of an equivalent circle having the same area as that of the projected particle shape)/(actual perimeter of the projected particle shape). Circularity being 1.0 indicates a theoretically perfect sphere.

In some embodiments, the particle size of the carbon material is 3 μm to 40 μm, and the circularity is greater than 0.1, greater than 0.5, greater than 0.8, greater than 0.85, greater than 0.9 or greater than 1.0.

For high-current-density charging and discharging characteristics, the larger the circularity of the carbon material is, the higher the filling performance is, which helps to suppress resistance between particles, thereby improving the charging and discharging characteristics of the electrochemical device at high current density.

The circularity of the carbon material may be measured using a flow type particle image analyzer (FPIA manufactured by Sysmex Corporation): dispersing 0.2 g of a test sample in a 0.2 wt % aqueous solution (50 mL) of poly(oxyethylene(20)) sorbitan monolaurate, propagating an ultrasonic wave of 28 kHz to the dispersion for 1 minute at an output of 60 W, and then examining particles having a particle size in the range of 3 μm to 40 μm with the analyzer having a detection range set at 0.6 μm to 400 μm.

The method for increasing circularity is not particularly limited. Spherification may be adopted to make the shapes of the gaps between the carbon material particles uniform during the preparation of the electrodes. Spherification may be performed by mechanical means such as applying a shearing force or compressive force, or by mechanical/physical means such as granulation of multiple particles by applying a binder or by the adhesion of particles, so as to make the carbon material particles nearly perfectly spherical.

Tap Density

In some embodiments, the tap density of the carbon material is greater than 0.1 $g/cm^3$, greater than 0.5 $g/cm^3$, greater than 0.7 $g/cm^3$, or greater than 1 $g/cm^3$. In some embodiments, the tap density of the carbon material is less than 2 $g/cm^3$, less than 1.8 $g/cm^3$, or less than 1.6 $g/cm^3$. In some embodiments, the tap density of the carbon material is in a range defined by any two of the above values. When the tap density of the carbon material falls within the above ranges, the capacity of the electrochemical device can be ensured, and the increase in resistance between carbon material particles can be suppressed.

The tap density of the carbon material may be tested using the following method: sieving the test sample through a mesh with a 300 μm mesh size to fall into a 20 $cm^3$ tapping tank until the tapping tank is filled up with the test sample to its top surface, causing a powder density tester (e.g., tap denser manufactured by Seishin Enterprise Co., Ltd.) to shake for 1000 times with a stroke length of 10 mm, and calculating the tap density according to the current mass and the mass of the test sample.

Orientation Ratio

In some embodiments, the orientation ratio of the carbon material is greater than 0.005, greater than 0.01 or greater than 0.015. In some embodiments, the orientation ratio of the carbon material is less than 0 67. In some embodiments, the orientation ratio of the carbon material is in a range defined by any two of the above values. When the orientation ratio of the carbon material falls within the above ranges, the electrochemical device has excellent high-density charging and discharging characteristics.

Aspect Ratio

In some embodiments, the aspect ratio of the carbon material is greater than 1, greater than 2 or greater than 3 In some embodiments, the aspect ratio of the carbon material is less than 10, less than 8 or less than 5. In some embodiments, the aspect ratio of the carbon material is in a range defined by any two of the above values.

When the aspect ratio of the carbon material falls within the above ranges, a more even coating can be achieved, so the electrochemical device has excellent high-current-density charging and discharging characteristics.

(3) Contact Angle

According to some embodiments of the present application, as measured using a contact angle measurement method, the contact angle of the anode mixture layer relative to the non-aqueous solvent is not greater than 60°. In some embodiments, as measured using a contact angle measurement method, the contact angle of the anode mixture layer relative to the non-aqueous solvent is not greater than 50°. In some embodiments, as measured using a contact angle measurement method, the contact angle of the anode mixture layer relative to the non-aqueous solvent is not greater than 30°. When the anode mixture layer has the above angle relative to the non-aqueous solvent, the interface of the anode mixture layer has few defects and has good stability during the charging and discharging cycles of the electrochemical device, thereby ensuring good cycle performance and high-temperature storage performance of the electrochemical device.

According to some embodiments of the present application, the contact angle measurement method is dropping 3 μL of a diethyl carbonate droplet onto the surface of the anode mixture layer and testing, within 100 seconds after the dropping, the contact angle of the droplet on the surface of the anode mixture layer.

According to some embodiments of the present application, as measured using the contact angle measurement method, the droplet diameter of the non-aqueous solvent on the anode mixture layer is not greater than 30 mm In some embodiments, as measured using the contact angle measurement method, the droplet diameter of the non-aqueous solvent on the anode mixture layer is not greater than 20 mm In some embodiments, as measured using the contact angle measurement method, the droplet diameter of the non-aqueous solvent on the anode mixture layer is not greater than 15 mm In some embodiments, as measured using the contact angle measurement method, the droplet diameter of the non-aqueous solvent on the anode mixture layer is not greater than 10 mm When the anode mixture layer has the above contact angle relative to the non-aqueous solvent and the non-aqueous solvent has the above droplet diameter, the cycle performance and high-temperature storage performance of the electrochemical device can be further improved.

The contact angle of the anode mixture layer relative to the non-aqueous solvent and the droplet diameter of the non-aqueous solvent may be measured using the following method: dropping 3 μL of diethyl carbonate onto the surface of the anode mixture layer, testing the droplet diameter by using a JC2000D3E contact angle goniometer within 100 seconds, and applying a 5-point fitting method (i.e., two points on the left and right planes of the droplet are selected first, the liquid-solid junction is determined, and then three points on the droplet arc are selected) for fitting to obtain the contact angle of the anode mixture layer relative to the non-aqueous solvent. Each sample is measured at least three times, at least three pieces of data which differ from each other by less than 5° are selected, and an average value is calculated, thus obtaining the contact angle of the anode mixture layer relative to the non-aqueous solvent. The non-aqueous solvent used for contact angle testing may be a commonly used electrolyte solvent such as diethyl carbonate, ethyl methyl carbonate, dimethyl carbonate, methyl propyl carbonate, or methyl isopropyl carbonate.

(4) Porosity

According to some embodiments of the present application, the porosity of the anode mixture layer is 10% to 60%. In some embodiments, the porosity of the anode mixture layer is 15% to 50%. In some embodiments, the porosity of the anode mixture layer is 20% to 40%. In some embodiments, the porosity of the anode mixture layer is 25% to 30%. In some embodiments, the porosity of the anode mixture layer is 10%, 15%, 20%, 25%, 30%, 35%, 40%, 45%, 50%, 55%, or 60% or in a range defined by any two of these values.

The porosity of the anode mixture layer may be measured using the following method: using a true density tester AccuPyc II 1340 for testing, where each sample is measured at least three times, at least three pieces of data are selected, and an average value is calculated. The porosity of the anode mixture layer is calculated based on the following equation: porosity=$(V1-V2)/V1 \times 100\%$, where $V1$ represents the apparent volume, $V1$=sample surface area×sample thickness×sample quantity, and $V2$ represents the true volume.

(5) Thickness

The thickness of the anode mixture layer is a thickness of the anode mixture layer on any side of the anode current collector. In some embodiments, the thickness of the anode mixture layer is not greater than 200 μm. In some embodiments, the thickness of the anode mixture layer is not greater than 150 μm. In some embodiments, the thickness of the anode mixture layer is not greater than 100 μm. In some embodiments, the thickness of the anode mixture layer is not greater than 50 μm. In some embodiments, the thickness of the anode mixture layer is not less than 15 μm. In some embodiments, the thickness of the anode mixture layer is not less than 20 μm. In some embodiments, the thickness of the anode mixture layer is not less than 30 μm. In some embodiments, the thickness of the anode mixture layer is in a range defined by any two of the above values.

6. Ball Impact Test for Anode Mixture Layer

According to some embodiments of the present application, a minimum height from which a ball having a diameter of 15 mm and a weight of 12 g falls onto the anode mixture layer to cause formation of cracks on the anode mixture layer is at least 50 cm. In some embodiments, a minimum height from which a ball having a diameter of 15 mm and a weight of 12 g falls onto the anode mixture layer to cause formation of cracks on the anode mixture layer is 150 cm or below.

The minimum height for the ball to cause formation of cracks on the anode mixture layer is related to the interface of the mixture layer. When the minimum height is at least 50 cm, no cracks are formed in an undesired direction during the cutting of the interface of the anode mixture layer.

Provided that a balance is achieved between the machine direction (MD) and transverse direction (TD), the minimum height for the ball to cause formation of cracks on the anode mixture layer is related to the thickness and porosity of the anode mixture layer. The larger the thickness of the anode mixture layer is, the larger the minimum height for the ball to cause the formation of cracks on the anode mixture layer will be, but an excessively thick anode mixture layer causes a decrease in the energy density of the electrochemical device. The lower the porosity of the anode mixture layer is, the larger the minimum height for the ball to cause the formation of cracks on the anode mixture layer will be, but an excessively low porosity degrades the electrochemical performance (e.g., rate performance) of the electrochemical device.

(7) Other Components

Trace Elements

According to some embodiments of the present application, the anode mixture layer further includes at least one metal selected from molybdenum, iron, and copper. These metal elements can react with some organic substances with poor electrical conductivity in the anode active material, thereby facilitating the formation of a film on the surface of the anode active material.

According to some embodiments of the present application, the above metal elements are present in the anode mixture layer in trace amounts. Excess metal elements are likely to form electrically nonconductive byproducts attaching to the surface of the anode. In some embodiments, the content of the at least one metal is not greater than 0.05 wt % based on the total weight of the anode mixture layer. In some embodiments, the content of the at least one metal is not greater than 0.03 wt %. In some embodiments, the content of the at least one metal is not greater than 0.01 wt %.

Silicon-Containing and/or Tin-Containing Material

According to some embodiments of the present application, the anode mixture layer further includes at least one of a silicon-containing material, a tin-containing material, or an alloy material. According to some embodiments of the present application, the anode mixture layer further includes at least one of a silicon-containing material or a tin-containing material. In some embodiments, the anode mixture layer further includes one or more of a silicon-containing material, a silicon-carbon composite material, a silicon-oxygen material, an alloy material and a lithium-containing metal composite oxide material. In some embodiments, the anode mixture layer further includes other types of anode active materials, for example, one or more materials containing metal elements and metalloid elements capable of forming an alloy with lithium. In some embodiments, examples of the metal elements and metalloid elements include, but are not limited to, Mg, B, Al, Ga, In, Si, Ge, Sn, Pb, Bi, Cd, Ag, Zn, Hf, Zr, Y, Pd and Pt. In some embodiments, examples of the metal elements and metalloid elements include Si, Sn or a combination thereof Si and Sn have excellent capacity to deintercalate lithium ions, and can provide a high energy density for lithium-ion batteries. In some embodiments, the other types of anode active materials may further include one or more of a metal oxide and a polymer compound. In some embodiments, the metal oxide includes, but is not limited to, iron oxide, ruthenium oxide and molybdenum oxide. In some embodiments, the polymer compound includes, but is not limited to, polyacetylene, polyaniline and polypyrrole.

Anode Conductive Material

In some embodiments, the anode mixture layer further includes an anode conductive material, and the conductive material may include any conductive material as long as it does not cause a chemical change. Non-limiting examples of the conductive material include a carbon-based material (e.g., natural graphite, artificial graphite, carbon black, acetylene black, ketjen black, and carbon fiber), a conductive polymer (e.g., a polyphenylene derivative) and a mixture thereof.

Anode Binder

In some embodiments, the anode mixture layer further includes an anode binder. The anode binder increases the binding of the anode active material particles to each other and the binding of the anode active material to the current collector. The type of the anode binder is not particularly limited and the anode binder may be any material that is stable in the electrolyte or the solvent used in the preparation of electrodes.

Examples of the anode binder include, but are not limited to, resin-based polymers such as polyethylene, polypropylene, polyethylene terephthalate, polymethyl methacrylate, aromatic polyamide, polyimide, cellulose, nitrocellulose or the like; rubber-like polymers such as SBR (styrene-butadiene rubber), isoprene rubber, butadiene rubber, fluororubber, NBR (acrylonitrile-butadiene rubber), ethylene-propylene rubber or the like; styrene-butadiene-styrene block copolymers or hydrogenated products thereof; thermoplastic elastomeric polymers such as EPDM (ethylene-propylene-diene terpolymer), styrene-ethylene-butadiene-styrene copolymers, styrene-isoprene-styrene block copolymers, or hydrogenated products thereof; soft resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride, polytetrafluoroethylene, fluorinated polyvinylidene fluoride, polytetrafluoroethylene-ethylene copolymers and the like; and polymer compositions having ionic conductivity towards alkali metal ions (e.g., lithium ions). The anode binder may be used alone or in any combination.

In some embodiments, the content of the anode binder is greater than 0.1 wt %, greater than 0.5 wt %, or greater than 0.6 wt % based on the total weight of the anode mixture layer. In some embodiments, the content of the anode binder is less than 20 wt %, less than 15 wt %, less than 10 wt %, or less than 8 wt % based on the total weight of the anode mixture layer. In some embodiments, the content of the anode binder is in a range defined by any two of the above values. When the content of the anode binder falls within the above ranges, the capacity of the electrochemical device and the strength of the anode can be fully ensured.

In the case that the anode mixture layer includes a rubber-like polymer (e.g., SBR), in some embodiments, the content of the anode binder is greater than 0.1 wt %, greater than 0.5 wt %, or greater than 0.6 wt % based on the total weight of the anode mixture layer. In some embodiments, the content of the anode binder is less than 5 wt %, less than 3 wt %, or less than 2 wt % based on the total weight of the anode mixture layer. In some embodiments, the content of the anode binder is in a range defined by any two of the above values based on the total weight of the anode mixture layer.

In the case that the anode mixture layer includes a fluoropolymer (e.g., polyvinylidene fluoride), in some embodiments, the content of the anode binder is greater than 1 wt %, greater than 2 wt %, or greater than 3 wt % based on the total weight of the anode mixture layer. In some embodiments, the content of the anode binder is less than 15 wt %, less than 10 wt %, or less than 8 wt % based on the total weight of the anode mixture layer. The content of the anode binder is in a range defined by any two of the above values based on the total weight of the anode mixture layer.

Solvent

The type of the solvent for forming the anode slurry is not particularly limited and may be any solvent capable of dissolving or dispersing the anode active material, the anode binder, as well as a thickener and conductive material that are used if needed. In some embodiments, the solvent for forming the anode slurry may be any one of an aqueous solvent or an organic solvent. Examples of the aqueous solvent may include, but are not limited to, water, alcohol, and the like. Examples of the organic solvent may include, but are not limited to, N-methylpyrrolidone (NMP), dimethylformamide, dimethyl acetamide, methyl ethyl ketone, cyclohexanone, methyl acetate, methacrylate, diethyl triamine, N,N-dimethylaminopropyl amine, tetrahydrofuran (THF), toluene, acetone, diethyl ether, hexamethylphosphoric amide, dimethyl sulfoxide, benzene, xylene, quinoline, pyridine, methyl naphthalene, hexane and the like. The solvent may be used alone or in any combination.

Thickener

The thickener is generally used for adjusting the viscosity of the anode slurry. The type of the thickener is not particularly limited, and examples of the thickener may include, but are not limited to, carboxymethyl cellulose, methyl cellulose, hydroxymethyl cellulose, ethyl cellulose, polyvinyl alcohol, oxidized starch, phosphorylated starch, casein and salts thereof. The thickener may be used alone or in any combination.

In some embodiments, the content of the thickener is greater than 0.1 wt %, greater than 0.5 wt %, or greater than 0.6 wt % based on the total weight of the anode mixture layer. In some embodiments, the content of the thickener is less than 5 wt %, less than 3 wt %, or less than 2 wt % based on the total weight of the anode mixture layer. When the content of the thickener falls within the above ranges, the decrease in capacity and increase in resistance of the electrochemical device can be suppressed, and good coatability of the anode slurry can be ensured.

(8) Surface Coating

In some embodiments, the surface of the anode mixture layer may be attached with a substance having a different composition. Examples of the substance attached to the surface of the anode mixture layer include, but are not limited to, alumina, silica, titania, zirconia, magnesia, calcium oxide, boron oxide, antimony oxide, bismuth oxide and other oxides, lithium sulfate, sodium sulfate, potassium sulfate, magnesium sulfate, calcium sulfate, aluminum sulfate and other sulfates, lithium carbonate, calcium carbonate, magnesium carbonate and other carbonates.

(9) Content of Anode Active Material

In some embodiments, the content of the anode active material is greater than 80 wt %, greater than 82 wt %, or greater than 84 wt % based on the total weight of the anode mixture layer. In some embodiments, the content of the anode active material is less than 99 wt % or less than 98 wt % based on the total weight of the anode mixture layer. In some embodiments, the content of the anode active material is in a range defined by any two of the above values based on the total weight of the anode mixture layer.

(10) Density of Anode Active Material

In some embodiments, the density of the anode active material in the anode mixture layer is greater than 1 g/cm³, greater than 1.2 g/cm³, or greater than 1.3 g/cm³. In some embodiments, the density of the anode active material in the anode mixture layer is less than 2.2 g/cm³, less than 2.1 g/cm³, less than 2.0 g/cm³, or less than 1.9 g/cm³. In some embodiments, the density of the anode active material in the anode mixture layer is in a range defined by any two of the above values.

When the density of the anode active material falls within the above ranges, breakage of the anode active material particles can be prevented, the degradation of the high-current-density charging and discharging characteristics caused by the increase in initial irreversible capacity of the electrochemical device or caused by reduced permeation of the electrolyte near the anode current collector/anode active material interface can be suppressed, and the decrease in capacity and increase in resistance of the electrochemical device can be suppressed.

2. Anode Current Collector

Any well-known current collector may be used as the current collector for maintaining the anode active material. Examples of the anode current collector include, but are not limited to, metal materials such as aluminum, copper, nickel, stainless steel, and nickel plated steel. In some embodiments, the anode current collector is copper.

In the case that the anode current collector is a metal material, the form of the anode current collector may include, but is not limited to, metal foil, metal cylinder, metal reel, metal plate, metal film, metal mesh, stamped metal, foamed metal, and the like. In some embodiments, the anode current collector is a metal film In some embodiments, the anode current collector is a copper foil. In some embodiments, the anode current collector is a rolled copper foil based on a rolling method or an electrolytic copper foil based on an electrolytic method.

In some embodiments, the thickness of the anode current collector is greater than 1 μm or greater than 5 μm. In some embodiments, the thickness of the anode current collector is less than 100 μm or less than 50 μm. In some embodiments, the thickness of the anode current collector is in a range defined by any two of the above values.

A thickness ratio between the anode current collector and the anode mixture layer is the ratio of the thickness of the anode mixture layer of the single side before the injection of the electrolyte to the thickness of the anode current collector, and its value is not particularly limited. In some embodiments, the thickness ratio between the anode current collector and the anode mixture layer is less than 150, less than 20, or less than 10. In some embodiments, the thickness ratio between the anode current collector and the anode mixture layer is greater than 0.1, greater than 0 4, or greater than 1

In some embodiments, the thickness ratio between the anode current collector and the anode mixture layer is in a range defined by any two of the above values. When the thickness ratio between the anode current collector and the anode mixture layer falls within the above ranges, the capacity of the electrochemical device can be enhanced, and heat generation in the anode current collector during high-current-density charging and discharging can be suppressed.

II. Electrolyte

The electrolyte used in the electrochemical device of the present application includes an electrolyte and a solvent that dissolves the electrolyte. In some embodiments, the electrolyte used in the electrochemical device of the present application further includes an additive.

According to some embodiments of the present application, the electrolyte includes at least one of the following compounds:

(a) propionate;
(b) an organic compound having a cyano group(s);
(c) lithium difluorophosphate; or
(d) a compound of Formula 1:

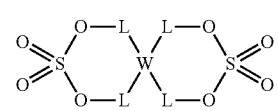

Formula 1 wherein
W is selected from

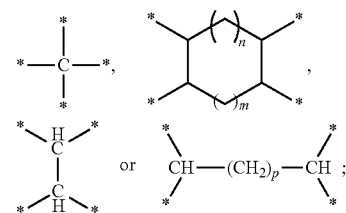

L is selected from a single bond or methylene;
m is an integer from 1 to 4;
n is an integer from 0 to 2; and
p is an integer from 0 to 6.

(a) Propionate

According to the embodiments of the present application, the propionate has a structure of Formula 2:

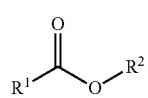

Formula 2 wherein
R¹ is selected from ethyl or haloethyl, and
R² is selected from $C_1$-$C_6$ alkyl or $C_1$-$C_6$ haloalkyl.

In some embodiments, the propionate includes, but is not limited to, methyl propionate, ethyl propionate, propyl propionate, butyl propionate, amyl propionate, methyl halopropionate, ethyl halopropionate, propyl halopropionate, butyl halopropionate and amyl halopropionate. In some embodiments, the propionate is selected from at least one of: methyl propionate, ethyl propionate, propyl propionate, butyl propionate, or amyl propionate. In some embodiments, the halo group in the methyl halopropionate, ethyl halopropionate, propyl halopropionate, butyl halopropionate and amyl halopropionate is selected from one or more of a fluoro group (—F), a chloro group (—Cl), a bromo group (—Br) and an iodo group (—I). In some embodiments, the halo group is a fluoro group (—F), which can achieve a more excellent effect.

In some embodiments, the content of the propionate is 10 wt % to 65 wt % based on the total weight of the electrolyte. In some embodiments, the content of the propionate is 15 wt % to 60 wt % based on the total weight of the electrolyte. In some embodiments, the content of the propionate is 30 wt % to 50 wt % based on the total weight of the electrolyte. In some embodiments, the content of the propionate is 30 wt % to 40 wt % based on the total weight of the electrolyte. A more excellent effect can be achieved by using the propionate having the above content.

(b) Compound Having a Cyano Group(s)

In some embodiments, the compound having a cyano group(s) includes, but is not limited to, one or more of the group consisting of succinonitrile, glutaronitrile, adiponitrile, 1,5-dicyanopentane, 1,6-dicyanohexane, tetramethyl succinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile)ether, 3,5-dioxa-pimelonitrile, 1,4-bis(cyanoethoxy)butane, diethylene glycol bis(2-cyanoethyl) ether, triethylene glycol bis(2-cyanoethyl) ether, tetraethylene glycol bis(2-cyano ethyl) ether, 1,3-bis(2-cyanoethoxy)propane, 1,4-bis(2-cyanoethoxy)butane, 1,5-bis(2-cyanoethoxy)pentane, ethylene glycol bis(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane and 1,2,5-tris(cyanoethoxy)pentane.

The compound having a cyano group(s) may be used alone or in any combination. When the electrolyte contains two or more compounds having a cyano group(s), the content of the compound having a cyano group(s) means the total content of the two or more compounds having a cyano group(s). In some embodiments, the content of the compound having a cyano group(s) is 0.1 wt % to 15 wt % based on the total weight of the electrolyte. In some embodiments, the content of the compound having a cyano group(s) is 0.5 wt % to 10 wt % based on the total weight of the electrolyte. In some embodiments, the content of the compound having a cyano group(s) is 1 wt % to 8 wt % based on the total weight of the electrolyte. In some embodiments, the content of the compound having a cyano group(s) is 3 wt % to 5 wt % based on the total weight of the electrolyte.

(c) Lithium Difluorophosphate (LiPO$_2$F$_2$)

In some embodiments, the content of lithium difluorophosphate is 0.01 wt % to 15 wt % based on the total weight of the electrolyte. In some embodiments, the content of lithium difluorophosphate is 0.05 wt % to 12 wt % based on the total weight of the electrolyte. In some embodiments, the content of lithium difluorophosphate is 0.1 wt % to 10 wt % based on the total weight of the electrolyte. In some embodiments, the content of lithium difluorophosphate is 0.5 wt % to 8 wt % based on the total weight of the electrolyte. In some embodiments, the content of lithium difluorophosphate is 1 wt % to 5 wt % based on the total weight of the electrolyte. In some embodiments, the content of lithium difluorophosphate is 2 wt % to 4 wt % based on the total weight of the electrolyte.

(d) Compound of Formula 1

According to some embodiments of the present application, the electrolyte includes the compound of Formula 1, and the compound of Formula 1 is at least one selected from the following:

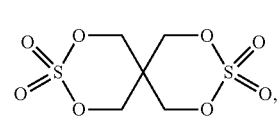

Formula 1-1

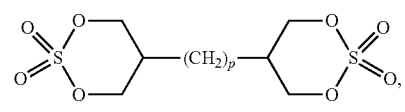

Formula 1-2

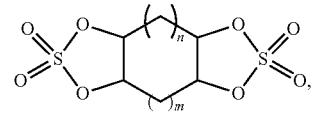

Formula 1-3

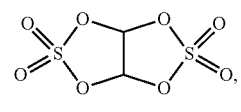

Formula 1-4

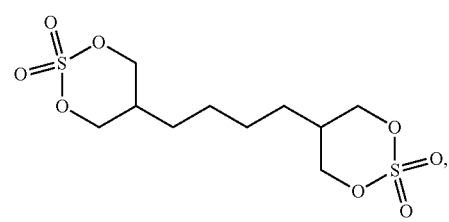

Formula 1-5

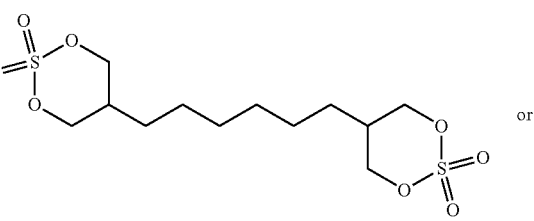

Formula 1-6 or

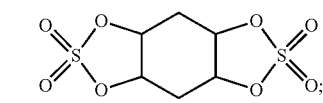

Formula 1-7 m is an integer from 1 to 4;
n is an integer from 0 to 2; and
p is an integer from 0 to 6.

Solvent

In some embodiments, the electrolyte further includes any non-aqueous solvent known in the prior art as a solvent of an electrolyte.

In some embodiments, the non-aqueous solvent includes, but is not limited to, one or more of the following: cyclic carbonate, chain carbonate, cyclic carboxylate, chain carboxylate, cyclic ether, chain ether, phosphorus-containing organic solvent, a sulfur-containing organic solvent and an aromatic fluorine-containing solvent.

In some embodiments, the cyclic carbonate includes, but is not limited to, one or more of the following: ethylene carbonate (EC), propylene carbonate (PC) and butylene carbonate. In some embodiments, the cyclic carbonate has 3-6 carbon atoms.

In some embodiments, examples of the cyclic carbonate may include, but are not limited to, one or more of the following: dimethyl carbonate, ethyl methyl carbonate, diethyl carbonate (DEC), methyl n-propyl carbonate, ethyl n-propyl carbonate, di-n-propyl carbonate or other chain carbonates. Examples of fluorine-substituted chain carbonates may include, but are not limited to, one or more of the following: bis(fluoromethyl)carbonate, bis(difluoromethyl) carbonate, bis(trifluoromethyl)carbonate, bis(2-fluoroethyl) carbonate, bis(2,2-difluoroethyl)carbonate, bis(2,2,2-trifluoroethyl)carbonate, 2-fluoroethyl methyl carbonate, 2,2-difluoroethyl methyl carbonate and 2,2,2-trifluoroethyl methyl carbonate.

In some embodiments, examples of the cyclic carboxylate may include, but are not limited to, one or more of γ-butyrolactone or γ-valerolactone. In some embodiments, a portion of the hydrogen atoms of the cyclic carboxylate can be substituted with fluorine.

In some embodiments, examples of the chain carboxylate may include, but are not limited to, one or more of the following: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate and ethyl pivalate. In some embodiments, a portion of the hydrogen atoms of the chain carboxylate can be substituted with fluorine. In some embodiments, examples of fluorine-substituted chain carboxylates may include, but are not limited to, methyl trifluoroacetate, ethyl trifluoroacetate, propyl trifluoroacetate, butyl trifluoroacetate and 2,2,2-trifluoroethyl trifluoroacetate.

In some embodiments, examples of the cyclic ether may include, but are not limited to, one or more of the following: tetrahydrofuran, 2-methyltetrahydrofuran, 1,3-dioxolane, 2-methyl-1,3-dioxolane, 4-methyl-1,3-dioxolane, 1,3-dioxane, 1,4-dioxane and dimethoxypropane.

In some embodiments, examples of the chain ether may include, but are not limited to, one or more of the following: dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane and 1,2-ethoxymethoxyethane.

In some embodiments, examples of the phosphorus-containing organic solvent may include, but are not limited to, one or more of the following: trimethyl phosphate, triethyl phosphate, dimethyl ethyl phosphate, methyl diethyl phosphate, ethidene methyl phosphate, ethidene ethyl phosphate, triphenyl phosphate, trimethyl phosphite, triethyl phosphite, triphenyl phosphite, tris(2,2,2-trifluoroethyl) phosphate and tris(2,2,3,3,3-pentafluoropropyl) phosphate.

In some embodiments, examples of the sulfur-containing organic solvent may include, but are not limited to, one or more of the following: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate and dibutyl sulfate. In some embodiments, a portion of the hydrogen atoms of the sulfur-containing organic solvent can be substituted with fluorine.

In some embodiments, the aromatic fluorine-containing solvent includes, but is not limited to, one or more of the following: fluorobenzene, difluorobenzene, trifluorobenzene, tetrafluorobenzene, pentafluorobenzene, hexafluorobenzene and trifluoromethylbenzene.

In some embodiments, the solvent used in the electrolyte of the present application includes cyclic carbonate, chain carbonate, cyclic carboxylate, chain carboxylate and combinations thereof. In some embodiments, the solvent used in the electrolyte of the present application includes an organic solvent selected from the group consisting of ethylene carbonate, propylene carbonate, diethyl carbonate, ethyl propionate, propyl propionate, n-propyl acetate, ethyl acetate and combinations thereof. In some embodiments, the solvent used in the electrolyte of the present application includes ethylene carbonate, propylene carbonate, diethyl carbonate, ethyl propionate, propyl propionate, γ-butyrolactone or a combination thereof.

After the chain carboxylate and/or the cyclic carboxylate are added to the electrolyte, the chain carboxylate and/or the cyclic carboxylate can form a passivation film on the surface of the electrode, thereby improving the capacity retention rate after the intermittent charging cycle of the electrochemical device. In some embodiments, the electrolyte contains 1 wt % to 60 wt % of the chain carboxylate, cyclic carboxylate or combination thereof. In some embodiments, the electrolyte contains ethyl propionate, propyl propionate, γ-butyrolactone or a combination thereof, and based on the total weight of the electrolyte, the content of the combination is 1 wt % to 60 wt %, 10 wt % to 60 wt %, 10 wt % to 50 wt %, or 20 wt % to 50 wt %. In some embodiments, based on the total weight of the electrolyte, the electrolyte contains 1 wt % to 60 wt %, 10 wt % to 60 wt %, 20 wt % to 50 wt %, 20 wt % to 40 wt %, or 30 wt % of propyl propionate.

Additive

In some embodiments, examples of the additive may include, but are not limited to, one or more of the following: fluorocarbonate, carbon-carbon double bond-containing ethylene carbonate, a sulfur-oxygen double bond-containing compound, and acid anhydrides.

In some embodiments, the content of the additive is 0.01 wt % to 15 wt %, 0.1 wt % to 10 wt %, or 1 wt % to 5 wt % based on the total weight of the electrolyte.

According to the embodiments of the present application, the content of the propionate is 1.5 to 30 times, 1.5 to 20 times, 2 to 20 times, or 5 to 20 times that of the additive based on the total weight of the electrolyte.

In some embodiments, the additive includes one or more fluorocarbonates. When the lithium-ion battery is charged/discharged, the fluorocarbonate can act together with the propionate to form a stable protective film on the surface of the anode, thereby suppressing the decomposition reaction of the electrolyte.

In some embodiments, the fluorocarbonate has the formula $C=O(OR_1)(OR_2)$, where $R_1$ and $R_2$ are each selected from alkyl or haloalkyl having 1-6 carbon atoms, where at least one of $R_1$ and $R_2$ is selected from fluoroalkyl having 1-6 carbon atoms, and $R_1$ and $R_2$ optionally form a 5- to 7-membered ring along with the atoms to which they are connected.

In some embodiments, examples of the fluorocarbonate may include, but are not limited to, one or more of the following: fluoroethylene carbonate, cis 4,4-difluoroethylene carbonate, trans 4,4-difluoroethylene carbonate, 4,5- difluoroethylene carbonate, 4-fluoro-4-methylethylene carbonate, 4-fluoro-5-methylethylene carbonate, methyl trifluoromethyl carbonate, methyl trifluoroethyl carbonate and ethyl trifluoroethyl carbonate.

In some embodiments, the additive includes one or more carbon-carbon double bond-containing ethylene carbonates. Examples of the carbon-carbon double bond-containing ethylene carbonate may include, but are not limited to, one or more of the following: vinylene carbonate, methyl vinylene carbonate, ethyl vinylene carbonate, 1,2-dimethylvinylene carbonate, 1,2-diethylvinylene carbonate, fluorovinylene carbonate, trifluoromethyl vinylene carbonate, vinyl ethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate and 1,1-diethyl-2-methylene ethylene carbonate. In some embodiments, the carbon-carbon double bond-containing ethylene carbonate includes vinylene carbonate, which is readily available and can achieve a more excellent effect.

In some embodiments, the additive includes one or more sulfur-oxygen double bond-containing compounds. Examples of the sulfur-oxygen double bond-containing compound may include, but are not limited to, one or more of the following: cyclic sulfate, chain sulfate, chain sulfonate, cyclic sulfonate, chain sulfite and cyclic sulfite.

Examples of the cyclic sulfate may include, but are not limited to, one or more of the following: 1,2-ethanediol sulfate, 1,2-propanediol sulfate, 1,3-propanediol sulfate, 1,2-butanediol sulfate, 1,3-butanediol sulfate, 1,4-butanediol sulfate, 1,2-pentanediol sulfate, 1,3-pentanediol sulfate, 1,4-pentanediol sulfate and 1,5-pentanediol sulfate.

Examples of the chain sulfate may include, but are not limited to, one or more of the following: dimethyl sulfate, ethyl methyl sulfate and diethyl sulfate.

Examples of the chain sulfonate may include, but are not limited to, one or more of the following: fluorosulfonate such as methyl fluorosulfonate and ethyl fluorosulfonate, methyl methanesulfonate, ethyl methanesulfonate, butyl dimethanesulfonate, methyl 2-(methylsulfonyloxy)propionate and ethyl 2-(methylsulfonyloxy)propionate.

Examples of the cyclic sulfonate may include, but are not limited to, one or more of the following: 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sulfonate, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methanedisulfonate and ethylene methanedisulfonate.

Examples of the chain sulfite may include, but are not limited to, one or more of the following: dimethyl sulfite, ethyl methyl sulfite and diethyl sulfite.

Examples of the cyclic sulfite may include, but are not limited to, one or more of the following: 1,2-ethanediol sulfite, 1,2-propanediol sulfite, 1,3-propanediol sulfite, 1,2-butanediol sulfite, 1,3-butanediol sulfite, 1,4-butanediol sulfite, 1,2-pentanediol sulfite, 1,3-pentanediol sulfite, 1,4-pentanediol sulfite and 1,5-pentanediol sulfite.

In some embodiments, the additive includes one or more acid anhydrides. Examples of the anhydride may include, but are not limited to, one or more of cyclic phosphoric anhydride, carboxylic acid anhydride, bi-sulfonic anhydride and carboxylic acid sulfonic anhydride. Examples of the cyclic phosphoric anhydride may include, but are not limited to, one or more of trimethylphosphoric acid cyclic anhydride, triethylphosphoric acid cyclic anhydride and tripropylphosphoric acid cyclic anhydride. Examples of the carboxylic anhydride may include, but are not limited to, one or more of succinic anhydride, glutaric anhydride and maleic anhydride. Examples of the disulfonic anhydride may include, but are not limited to, one or more of ethane disulfonic anhydride and propane disulfonic anhydride. Examples of the carboxylic sulfonic anhydride may include, but are not limited to, one or more of sulfobenzoic anhydride, sulfopropionic anhydride and sulfobutyric anhydride.

In some embodiments, the additive is a combination of fluorocarbonate and carbon-carbon double bond-containing ethylene carbonate. In some embodiments, the additive is a combination of fluorocarbonate and a sulfur-oxygen double bond-containing compound. In some embodiments, the additive is a combination of fluorocarbonate and a compound having 2-4 a cyano group(s). In some embodiments, the additive is a combination of fluorocarbonate and cyclic carboxylate. In some embodiments, the additive is a combination of fluorocarbonate and cyclic phosphoric anhydride. In some embodiments, the additive is a combination of fluorocarbonate and carboxylic anhydride. In some embodiments, the additive is a combination of fluorocarbonate and sulfonic anhydride. In some embodiments, the additive is a combination of fluorocarbonate and carboxylic sulfonic anhydride.

Electrolyte

The electrolyte is not particularly limited and may be any substance that is well known as an electrolyte. In the case of a lithium secondary battery, a lithium salt is generally used. Examples of the electrolyte may include, but are not limited to, inorganic lithium salts such as $LiPF_6$, $LiBF_4$, $LiClO_4$, $LiAlF_4$, $LiSbF_6$, $LiTaF_6$, and $LiWF_7$; lithium tungstates such as $LiWOF_5$; lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; lithium sulfonates such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$; lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, and $LiN(CF_3SO_2)(C_4F_9SO_2)$; lithium methide salts such as $LiC(FSO_2)_3$, $LiC(CF_3SO_2)_3$, and $LiC(C_2F_5SO_2)_3$; lithium oxalatoborates such as lithium difluorooxalatoborate and lithium bis(oxalato)borate; lithium (malonato)borates such as lithium bis(malonato)borate and lithium difluoro(malonato)borate; lithium (malonato)phosphates such as lithium tris(malonato)phosphate, lithium difluorobis(malonato)phosphate, and lithium tetrafluoro(malonato)phosphate; fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$; lithium oxalatoborates such as lithium difluorooxalatoborate and lithium bis(oxalato)borate; and lithium oxalatophosphates such as lithium tetrafluorooxalatophosphate, lithium difluorobis(oxalato)phosphate, and lithium tris(oxalato)phosphate.

In some embodiments, the electrolyte is selected from $LiPF_6$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonylimide, lithium cyclic 1,3-perfluoropropane disulfonyl imide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluorooxalatoborate, lithium bis(oxalato)borate, or lithium difluorobis(oxalato) phosphate, which helps improve the output power characteristics, high-rate charging and discharging characteristics, high-temperature storage characteristics, and cycle characteristics of the electrochemical device.

The content of the electrolyte is not particularly limited, as long as the effect of the present application is not compromised. In some embodiments, the total molar concentration of lithium in the electrolyte is greater than 0.3 mol/L, greater than 0.4 mol/L, or greater than 0.5 mol/L. In some embodiments, the total molar concentration of lithium in the electrolyte is less than 3 mol/L, less than 2.5 mol/L, or less than 2.0 mol/L. In some embodiments, the total molar concentration of lithium in the electrolyte is in a range defined by any two of the above values. When the concentration of the electrolyte falls within the above ranges, the quantity of charged lithium particles is not too small, and the viscosity is in an appropriate range, thereby ensuring good electrical conductivity.

In the case that two or more electrolytes are used, the electrolytes include at least one salt selected from the group consisting of monofluorophosphate, borate, oxalate, and fluorosulfonate. In some embodiments, the electrolyte includes a salt selected from the group consisting of monofluorophosphate, oxalate, and fluorosulfonate. In some embodiments, the electrolyte may include a lithium salt. In some embodiments, the content of the salt selected from the group consisting of monofluorophosphate, borate, oxalate, and fluorosulfonate is greater than 0.01 wt % or greater than 0.1 wt % based on the total weight of the electrolyte. In some embodiments, the content of the salt selected from the group consisting of monofluorophosphate, borate, oxalate, and fluorosulfonate is less than 20 wt % or less than 10 wt % based on the total weight of the electrolyte. In some embodiments, the content of the salt selected from the group consisting of monofluorophosphate, borate, oxalate, and fluorosulfonate is in a range defined by any two of the above values.

In some embodiments, the electrolyte includes one or more substances selected from the group consisting of monofluorophosphate, borate, oxalate, and fluorosulfonate, and one or more other salts. The other salts may be lithium salts listed above, and in some embodiments, are $LiPF_6$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, and $LiPF_3(C_2F_5)_3$. In some embodiments, the other salt is $LiPF_6$.

In some embodiments, the content of the other salts is greater than 0.01 wt % or greater than 0.1 wt % based on the total weight of the electrolyte. In some embodiments, the content of the other salts is less than 20 wt %, less than 15 wt %, or less than 10 wt % based on the total weight of the electrolyte. In some embodiments, the content of the other salts is in a range defined by any two of the above values. The above content of the other salts helps balance the electrical conductivity and viscosity of the electrolyte.

In addition to the above solvent, additive, and electrolyte salt, the electrolyte may contain additional additives such as an anode-film forming agent, a cathode protective agent, and an anti-overcharge agent if needed. The additives may be those commonly used in non-aqueous electrolyte secondary batteries, and examples of the additives may include, but are not limited to, vinylene carbonate, succinic anhydride, biphenyl, cyclohexylbenzene, 2,4-difluoroanisole, propane sultone, propene sultone, and the like. The additives may be used alone or in any combination. In addition, the content of the additives in the electrolyte is not particularly limited and may be properly set according to the type of the additive. In some embodiments, the content of the additive is less than 5 wt %, in the range of 0.01 wt % to 5 wt %, or in the range of 0.2 wt % to 5 wt % based on the total weight of the electrolyte.

III. Cathode

The cathode includes a cathode current collector and a cathode mixture layer disposed on one or two surfaces of the cathode current collector.

1. Cathode Mixture Layer

The cathode mixture layer includes a cathode active material layer, and the cathode active material layer includes a cathode active material. The cathode active material layer may be one or more layers. Each of the cathode active material layers may include the same or different cathode active materials. The cathode active material is any substance capable of reversibly intercalating and deintercalating metal ions such as lithium ions.

The type of the cathode active material is not particularly limited, and may be any substance capable of electrochemically absorbing and releasing metal ions (e.g., lithium ions). In some embodiments, the cathode active material is a substance containing lithium and at least one transition metal. Examples of the cathode active material may include, but are not limited to, a lithium transition metal composite oxide and a lithium transition metal phosphate compound.

In some embodiments, the transition metal in the lithium transition metal composite oxide includes V, Ti, Cr, Mn, Fe, Co, Ni, Cu, and the like. In some embodiments, the lithium transition metal composite oxide includes: lithium cobalt composite oxides such as $LiCoO_2$; lithium nickel composite oxides such as $LiNiO_2$; lithium manganese composite oxides such as $LiMnO_2$, $LiMn_2O_4$, and $Li_2MnO_4$; lithium nickel manganese cobalt composite oxides such as $LiNi_{1/3}Mn_{1/3}Co_{1/3}O_2$ and $LiNi_{0.5}Mn_{0.3}Co_{0.2}O_2$, where some of the transition metal atoms as the body of the lithium transition metal composite oxides are substituted with Na, K, B, F, Al, Ti, V, Cr, Mn, Fe, Co, Li, Ni, Cu, Zn, Mg, Ga, Zr, Si, Nb, Mo, Sn, W and other elements. Examples of the lithium transition metal composite oxide may include, but are not limited to, $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, $LiMn_{1.5}Ni_{0.5}O_4$, and the like. Examples of the lithium transition metal composite oxide include, but are not limited to, a combination of $LiCoO_2$ and $LiMn_2O_4$, where some of Mn in $LiMn_2O_4$ may be substituted with transition metals (e.g., $LiNi_{0.33}Co_{0.33}Mn_{0.33}O_2$), and some of Co in $LiCoO_2$ may be substituted with transition metals.

In some embodiments, the transition metal in the lithium transition metal phosphate compound includes V, Ti, Cr, Mn, Fe, Co, Ni, Cu, and the like. In some embodiments, the lithium transition metal phosphate compound includes: iron phosphates such as $LiFePO_4$, $Li_3Fe_2(PO_4)_3$, and $LiFeP_2O_7$; and cobalt phosphates such as $LiCoPO_4$, where some of the transition metal atoms as the body of the lithium transition metal phosphate compounds are substituted with Al, Ti, V, Cr, Mn, Fe, Co, Li, Ni, Cu, Zn, Mg, Ga, Zr, Nb, Si and other elements.

In some embodiments, the cathode active material includes lithium phosphate, which can improve the continuous charging characteristics of the electrochemical device. The use of lithium phosphate is not limited herein. In some embodiments, the cathode active material and lithium phosphate are used in a mixture. In some embodiments, the content of lithium phosphate is greater than 0.1 wt %, greater than 0.3 wt %, or greater than 0.5 wt % based on the total weight of the cathode active material and lithium phosphate. In some embodiments, the content of lithium phosphate is less than 10 wt %, less than 8 wt %, or less than 5 wt % based on the total weight of the cathode active material and lithium phosphate. In some embodiments, the content of lithium phosphate is in a range defined by any two of the above values.

Surface Coating

The surface of the cathode active material may be attached with a substance having a different composition. Examples of the substance attached to the surface may include, but are not limited to, alumina, silica, titania, zirconia, magnesia, calcium oxide, boron oxide, antimony oxide, bismuth oxide and other oxides, lithium sulfate, sodium sulfate, potassium sulfate, magnesium sulfate, calcium sulfate, aluminum sulfate and other sulfates, lithium carbonate, calcium carbonate, magnesium carbonate and other carbonates, and carbon.

The substances attached to the surface may be attached to the surface of the cathode active material by using the following methods: a method of dissolving or suspending the substance to be attached to the surface in a solvent, followed by infiltrating into the cathode active material and drying; a method of dissolving or suspending the substance to be attached to the surface in a solvent, followed by infiltrating into the cathode active material and repeated heating for reaction; a method of adding the substance to a precursor of the cathode active material followed by firing; and so on. In the case of carbon attachment, a method for mechanical attachment of a carbon material (e.g., activated carbon) may also be used.

In some embodiments, the content of the substance attached to the surface is greater than 0.1 ppm, greater than 1 ppm, or greater than 10 ppm based on the total weight of the cathode mixture layer. In some embodiments, the content of the substance attached to the surface is less than 20%, less than 10%, or less than 10% based on the total weight of the cathode mixture layer. In some embodiments, the content of the substance attached to the surface is in a range defined by any two of the above values based on the total weight of the cathode mixture layer.

The substance attached to the surface of the cathode active material can suppress the oxidation of the electrolyte on the surface of the cathode active material, thereby prolonging the service life of the electrochemical device. If the quantity of the substance attached to the surface is too small, the effect cannot be fully achieved; if the quantity of the substance attached to the surface is too large, the entrance and exit of lithium ions are impeded, sometimes leading to an increase in resistance.

In the present application, the substance attached to the surface of the cathode active material and having a composition different from that of the cathode active material is also referred to as "cathode active material".

Shape

In some embodiments, the shape of the cathode active material particles include, but is not limited to, bulky, polyhedral, spherical, ellipsoidal, plate-shaped, needle-shaped, columnar, and the like. In some embodiments, the cathode active material particles include primary particles, secondary particles, or a combination thereof. In some embodiments, primary particles may agglomerate to form secondary particles.

Tap Density

In some embodiments, the tap density of the cathode active material in the anode mixture layer is greater than 0.5 g/cm$^3$, greater than 0.8 g/cm$^3$, or greater than 1.0 g/cm$^3$. When the tap density of the cathode active material falls within the above ranges, the amount of dispersion medium required during the formation of the cathode mixture layer and the required amount of conductive material and cathode binder can be reduced, thereby ensuring the filling rate of the cathode active material and the capacity of the electrochemical device. A high-density cathode mixture layer may be formed by using composite oxide powder with high tap density. Generally, the tap density is preferably as large as possible, and no particular upper limit is set. In some embodiments, the tap density of the cathode active material in the anode mixture layer is less than 4.0 g/cm$^3$, less than 3.7 g/cm$^3$, or less than 3.5 g/cm$^3$. When the above upper limits are set for the tap density of the cathode active material, the reduction in load characteristics can be suppressed.

The tap density of the cathode active material may be calculated in the following manner placing 5 g to 10 g of the cathode active material powder into a 10 mL glass measuring cylinder, shaking for 200 times with a stroke length of 20 mm, and obtaining the powder filling density (tap density).

Median Particle Size (D50)

When the cathode active material particles are primary particles, the median particle size (D50) of the cathode active material particles is the primary particle size of the cathode active material particles. When the primary particles of the cathode active material particles agglomerate to form secondary particles, the median particle size (D50) of the cathode active material particles is the secondary particle size of the cathode active material particles.

In some embodiments, the median particle size (D50) of the cathode active material particles is greater than 0.3 μm, greater than 0.5 μm, greater than 0.8 μm, or greater than 1.0 μm. In some embodiments, the median particle size (D50) of the cathode active material particles is less than 30 μm, less than 27 μm, less than 25 μm, or less than 22 μm. In some embodiments, the median particle size (D50) of the cathode active material particles is in a range defined by any two of the above values. When the median particle size (D50) of the cathode active material particles falls within the above ranges, a cathode active material with high tap density can be obtained, and the degradation of the performance of the electrochemical device can be suppressed. In addition, during the preparation of the cathode of the electrochemical device (that is, when the cathode active material, the conductive material, the binder and the like are slurried with a solvent and the slurry is coated to form a thin film), the formation of stripes can be prevented. Herein, by mixing two or more cathode active materials having different median particle sizes, the filling rate during the preparation of the cathode can be further improved.

The median particle size (D50) of the cathode active material particles may be measured using a laser diffraction/scattering particle size distribution measuring instrument. In the case that the LA-920 manufactured by Horiba, Ltd is used as the particle size distribution analyzer, a 0.1 wt % aqueous solution of sodium hexametaphosphate is used as the dispersion medium for the measurement, and the measurement refractive index is set to 1.24 after 5 min of ultrasonic dispersion.

Average Primary Particle Size

In the case that the primary particles of the cathode active material particles agglomerate to form secondary particles, in some embodiments, the average primary particle size of the cathode active material is greater than 0.05 μm, greater than 0.1 μm, or greater than 0.5 μm. In some embodiments, the average primary particle size of the cathode active material is less than 5 μm, less than 4 μm, less than 3 μm, or less than 2 μm. In some embodiments, the average primary particle size of the cathode active material is in a range defined by any two of the above values. When the average primary particle size of the cathode active material falls within the above ranges, the powder filling rate and the specific surface area can be ensured, the degradation of the performance of the battery can be suppressed, and a suitable crystallinity can be obtained, thereby ensuring the reversibility of charging and discharging of the electrochemical device.

The average primary particle size of the cathode active material may be obtained by observing an image obtained by a scanning electron microscope (SEM): in an SEM image with a magnification of 10000×, any 50 primary particles are selected, the maximum section length between the left and right boundary of each primary particle in the horizontal direction is measured, and an average value of the maximum section length is calculated, which is defined as the average primary particle size.

Specific Surface Area (BET)

In some embodiments, the specific surface area (BET) of the cathode active material is greater than 0.1 $m^2/g$, greater than 0.2 $m^2/g$, or greater than 0.3 $m^2/g$. In some embodiments, the specific surface area (BET) of the cathode active material is less than 50 $m^2/g$, less than 40 $m^2/g$, or less than 30 $m^2/g$. In some embodiments, the specific surface area (BET) of the cathode active material is in a range defined by any two of the above values. When the specific surface area (BET) of the cathode active material falls within the above ranges, the performance of the electrochemical device can be ensured, and the cathode active material has good coatability.

The specific surface area (BET) of the cathode active material may be measured by using the following method: measuring the specific surface area by using a surface area meter (e.g., a fully automatic surface area measuring instrument manufactured by Okura Riken), where the test sample is preliminarily dried at 150° C. for 30 minutes while circulating nitrogen, and the specific surface area is then measured by a nitrogen adsorption BET single-point method utilizing a gas flow method using a nitrogen-helium mixed gas of which the relative pressure of nitrogen with respect to the atmospheric pressure is accurately adjusted to 0.3.

Cathode Conductive Material

The type of the cathode conductive material is not limited herein, and any known conductive material may be used. Examples of the cathode conductive material may include, but are not limited to, graphite such as natural graphite and artificial graphite, carbon black such as acetylene black, amorphous carbon such as needle coke, carbon nanotubes, graphene, and the like. The cathode conductive material may be used alone or in any combination.

In some embodiments, the content of the cathode conductive material is greater than 0.01 wt %, greater than 0.1 wt %, or greater than 1 wt % based on the total weight of the cathode mixture layer. In some embodiments, the content of the cathode conductive material is less than 50 wt %, less than 30 wt %, or less than 15 wt % based on the total weight of the cathode mixture layer. When the content of the cathode conductive material falls within the above ranges, sufficient electrical conductivity and the capacity of the electrochemical device can be ensured.

Cathode Binder

The type of the cathode binder used in the preparation of the cathode mixture layer is not particularly limited. In the case of a coating method, the cathode binder may be any material that can be dissolved or dispersed in the liquid medium used in the preparation of electrodes. Examples of the cathode binder may include, but are not limited to, one or more of the following: resin-based polymers such as polyethylene, polypropylene, polyethylene terephthalate, polymethyl methacrylate, polyimide, aromatic polyamide, cellulose, nitrocellulose or the like; rubber-like polymers such as SBR (styrene-butadiene rubber), NBR (acrylonitrile-butadiene rubber), fluororubber, isoprene rubber, butadiene rubber, ethylene-propylene rubber or the like; styrene-butadiene-styrene block copolymers or hydrogenated products thereof; thermoplastic elastomeric polymers such as EPDM (ethylene-propylene-diene terpolymer), styrene-ethylene-butadiene-ethylene copolymers, styrene-isoprene-styrene block copolymers, or hydrogenated products thereof; soft resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride (PVDF), polytetrafluoroethylene, fluorinated polyvinylidene fluoride, polytetrafluoroethylene-ethylene copolymers and the like; and polymer compositions having ionic conductivity towards alkali metal ions (especially lithium ions). The cathode binder may be used alone or in any combination.

In some embodiments, the content of the cathode binder is greater than 0.1 wt %, greater than 1 wt %, or greater than 1.5 wt % based on the total weight of the cathode mixture layer. In some embodiments, the content of the cathode binder is less than 80 wt %, less than 60 wt %, less than 40 wt %, or less than 10 wt % based on the total weight of the cathode mixture layer. When the content of the cathode binder falls within the above ranges, the cathode has good electrical conductivity and sufficient mechanical strength, and the capacity of the electrochemical device can be ensured.

Solvent

The type of the solvent for forming the cathode slurry is not limited herein and may be any solvent capable of dissolving or dispersing the cathode active material, the conductive material, the cathode binder, as well as a thickener that is used if needed. Examples of the solvent for forming the cathode slurry may include any one of an aqueous solvent or an organic solvent. Examples of the aqueous medium may include, but are not limited to, water, a mixture medium of alcohol and water, and the like. Examples of the organic medium may include, but are not limited to, aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylene triamine and N,N-dimethylaminopropylamine; ethers such as diethyl ether, propylene oxide, and tetrahydrofuran (THF); amides such as N-methylpyrrolidone (NMP), dimethylformamide, and dimethyl acetamide; and aprotic polar solvents such as hexamethyl phosphramide and dimethyl sulfoxide.

Thickener

The thickener is generally used for adjusting the viscosity of the slurry. In the case that an aqueous medium is used, the thickener and styrene-butadiene rubber (SBR) may be used for slurrying. The type of the thickener is not particularly limited, and examples of the thickener may include, but are not limited to, carboxymethyl cellulose, methyl cellulose, hydroxymethyl cellulose, ethyl cellulose, polyvinyl alcohol, oxidized starch, phosphorylated starch, casein and salts thereof. The thickener may be used alone or in any combination.

In some embodiments, the content of the thickener is greater than 0.1 wt %, greater than 0.2 wt %, or greater than 0.3 wt % based on the total weight of the cathode mixture layer. In some embodiments, the content of the thickener is less than 5 wt %, less than 3 wt %, or less than 2 wt % based on the total weight of the cathode mixture layer. In some embodiments, the content of the thickener is in a range defined by any two of the above values based on the total weight of the cathode mixture layer. When the content of the thickener falls within the above ranges, the cathode slurry has good coatability and the reduction in capacity and increase in resistance of the electrochemical device can be suppressed.

Content of Cathode Active Material

In some embodiments, the content of the cathode active material is greater than 80 wt %, greater than 82 wt %, or greater than 84 wt % based on the total weight of the cathode mixture layer. In some embodiments, the content of the cathode active material is less than 99 wt % or less than 98 wt % based on the total weight of the cathode mixture layer. In some embodiments, the content of the cathode active material is in a range defined by any two of the above values based on the total weight of the cathode mixture layer. When the content of the cathode active material falls within the above ranges, the capacity of the cathode active material in the cathode mixture layer can be ensured, and the strength of the cathode can be ensured.

Density of Cathode Active Material

For the cathode mixture layer obtained by coating and drying, densification may be performed using a manual press or a roller press in order to increase the filling density of the cathode active material. In some embodiments, the density of the cathode mixture layer is greater than 1.5 g/cm$^3$, greater than 2 g/cm$^3$, or greater than 2.2 g/cm$^3$. In some embodiments, the density of the cathode mixture layer is less than 5 g/cm$^3$, less than 4.5 g/cm$^3$, or less than 4 g/cm$^3$. In some embodiments, the density of the cathode mixture layer is in a range defined by any two of the above values. When the density of the cathode mixture layer falls within the above ranges, the electrochemical device has good charging and discharging characteristics, and the increase in resistance can be suppressed.

Thickness of Cathode Mixture Layer

The thickness of the cathode mixture layer is a thickness of the cathode mixture layer on any side of the cathode current collector. In some embodiments, the thickness of the cathode mixture layer is greater than 10 μm or greater than 20 μm. In some embodiments, the thickness of the cathode mixture layer is less than 500 μm or less than 450 μm.

Preparation of Cathode Active Material

The cathode active material may be prepared by using a commonly used method for preparing an inorganic compound. To prepare a spherical or ellipsoidal cathode active material, the following preparation method may be used: dissolving or pulverizing and dispersing a raw material transition metal in a solvent such as water, adjusting the pH while stirring, preparing a spherical precursor and recovering it; after drying if needed, adding a Li source such as LiOH, Li$_2$CO$_3$, or LiNO$_3$, and firing at a high temperature, thus obtaining the cathode active material.

2. Cathode Current Collector

The type of the cathode current collector is not particularly limited, and the cathode current collector may be made of any material suitable for use as the cathode current collector. Examples of the cathode current collector may include, but are not limited to, metal materials such as aluminum, stainless steel, nickel plating, titanium, and tantalum, and carbon materials such as carbon cloth and carbon paper. In some embodiments, the cathode current collector is a metal material. In some embodiments, the cathode current collector is aluminum.

The form of the cathode current collector is not particularly limited. When the cathode current collector is a metal material, the form of the cathode current collector may include, but is not limited to, metal foil, metal cylinder, metal reel, metal plate, metal film, metal mesh, stamped metal, foamed metal, and the like. When the cathode current collector is a carbon material, the form of the cathode current collector may include, but is not limited to, carbon plate, carbon film, carbon cylinder, and the like. In some embodiments, the cathode current collector is a metal film In some embodiments, the metal film is mesh-shaped. The thickness of the metal film is not particularly limited. In some embodiments, the thickness of the metal film is greater than 1 μm, greater than 3 μm, or greater than 5 μm. In some embodiments, the thickness of the metal film is less than 1 mm, less than 100 μm, or less than 50 μm. In some embodiments, the thickness of the metal film is in a range defined by any two of the above values.

In order to reduce the electrical contact resistance of the cathode current collector and the cathode mixture layer, the cathode current collector may include a conductive aid on its surface. Examples of the conductive aid may include, but are not limited to, carbon and noble metals such as gold, platinum, and silver.

A thickness ratio between the cathode current collector and the cathode mixture layer is the ratio of the thickness of the cathode mixture layer of the single side before the injection of the electrolyte to the thickness of the cathode current collector, and its value is not particularly limited. In some embodiments, the thickness ratio between the cathode current collector and the cathode mixture layer is less than 20, less than 15, or less than 10. In some embodiments, the thickness ratio between the cathode current collector and the cathode mixture layer is greater than 0.5, greater than 0.8, or greater than 1. In some embodiments, the thickness ratio between the cathode current collector and the cathode mixture layer is in a range defined by any two of the above values. When the thickness ratio between the cathode current collector and the cathode mixture layer falls within the above ranges, heat generation in the cathode current collector during high-current-density charging and discharging can be suppressed, and the capacity of the electrochemical device can be ensured.

3. Composition and Preparation of Cathode

The cathode may be prepared by forming, on a current collector, a cathode mixture layer containing a cathode active material and a binder. The cathode using the cathode active material may be prepared by a conventional method: dry mixing a cathode active material and a binder (and a conductive material and a thickener if needed) to form flakes, and pressing the obtained flakes on a cathode current collector; or dissolving or dispersing the material in a liquid medium to form a slurry, coating the slurry on a cathode current collector, and drying to form a cathode mixture layer on the current collector, thus obtaining the cathode.

IV. Separator

To prevent a short-circuit, a separator is generally disposed between the cathode and the anode. In this case, the electrolyte of the present application generally infiltrates to the separator.

The material and shape of the separator are not particularly limited, as long as the effect of the present application is not significantly compromised. The separator may be formed from a material stable in the electrolyte of the present application, such as resin, glass fiber, or inorganic matter. In some embodiments, the separator is in the form of a porous sheet or a nonwoven fabric which has an excellent liquid-retaining ability. Examples of the material of a resin or glass-fiber separator include polyolefins, aromatic polyamide, polytetrafluoroethylene, polyether sulfone, glass filters, and the like. In some embodiments, the material of the separator is glass filter. In some embodiments, the polyolefin is polyethylene and polypropylene. In some embodiments, the polyolefin is polypropylene. The materials of the separator may be used alone or in any combination.

The separator may also be a laminate of the above materials. Examples of the separator include, but are not limited to, a three-layer separator including a polypropylene layer, a polyethylene layer, and a polypropylene layer in sequence.

Examples of the inorganic matter may include, but are not limited to, oxides such as alumina and silica, nitrides such as aluminum nitride and silicon nitride, and sulfates (e.g., barium sulfate and calcium sulfate). The form of the inorganic matter may include, but is not limited to, granules or fibers.

The separator is in the form of a thin film such as a nonwoven fabric, a woven fabric, or a microporous film In the form of a thin film, the separator has a pore size of 0.01 µm to 1 µm and a thickness of 5 µm to 50 µm. In addition to the form of the above separate thin film, the separator may have a structure in which a composite porous layer containing particles of the above inorganic matter is formed on the surface of the cathode and/or the surface of the anode using a resin binder. For example, alumina particles having a 90% particle size of less than 1 µm are applied to the respective surfaces of the cathode with fluororesin used as a binder to form a porous layer.

The thickness of the separator is arbitrary. In some embodiments, the thickness of the separator is greater than 1 µm, greater than 5 µm, or greater than 8 µm. In some embodiments, the thickness of the separator is less than 50 µm, less than 40 µm, or less than 30 µm. In some embodiments, the thickness of the separator is in a range defined by any two of the above values. When the thickness of the separator falls within the above ranges, the insulating property and mechanical strength can be ensured, and the rate performance and energy density of the electrochemical device can be ensured.

When a porous material such as a porous sheet or a nonwoven fabric is used as the separator, the porosity of the separator is arbitrary. In some embodiments, the porosity of the separator is greater than 20%, greater than 35%, or greater than 45%. In some embodiments, the porosity of the separator is less than 90%, less than 85%, or less than 75%. In some embodiments, the porosity of the separator is in a range defined by any two of the above values. When the porosity of the separator falls within the above ranges, the insulating property and mechanical strength can be ensured, and the film resistance can be suppressed, so that the electrochemical device has good rate performance.

The average pore size of the separator is also arbitrary. In some embodiments, the average pore size of the separator is less than 0.5 µm or less than 0.2 µm. In some embodiments, the average pore size of the separator is greater than 0.05 µm. In some embodiments, the average pore size of the separator is in a range defined by any two of the above values. When the average pore size of the separator is beyond the above ranges, a short circuit can easily occur. When the average pore size of the separator falls within the above ranges, the film resistance can be suppressed while preventing a short circuit, so that the electrochemical device has good rate performance.

V. Electrochemical Device Assembly

The electrochemical device assembly includes an electrode group, a current-collecting structure, an outer shell and a protection element.

Electrode Assembly

The electrode group may be either a laminated structure formed by laminating the cathode and the anode with the separator in between or a structure formed by spirally winding the cathode and the anode with the separator in between. In some embodiments, the proportion of the volume of the electrode group in the battery internal volume (hereinafter referred to as an electrode group proportion) is greater than 40% or greater than 50%. In some embodiments, the electrode group proportion is less than 90% or less than 80%. In some embodiments, the electrode group proportion is in a range defined by any two of the above values. When the electrode group proportion falls within the above ranges, the capacity of the electrochemical device can be ensured, the degradation of charge and discharge repeatability and high-temperature storage performance accompanying the internal pressure rise can be suppressed, and operation of a gas-releasing valve can be avoided.

Current-Collecting Structure

The current-collecting structure is not particularly limited. In some embodiments, the current-collecting structure is a structure which reduces resistance at wiring portions and jointing portions. When the electrode group is the above laminated structure, a structure formed by bundling the metal core portions of the respective electrode layers and welding the bundled portions to terminals is suitable for use as the current-collecting structure. Because the internal resistance increases as the area of one electrode increases, it is appropriate to dispose two or more terminals in the electrode to reduce the resistance. When the electrode group is the above wound structure, two or more lead structures may be disposed on each of the cathode and the anode and bundled to terminals, so as to reduce the internal resistance.

Outer Shell

The material of the outer shell is not particularly limited and may be any material stable with the electrolyte used. The outer shell may be made of, for example, but is not limited to, a metal such as a nickel-plated steel plate, stainless steel, aluminum, an aluminum alloy, or a magnesium alloy, or a laminate film of resin and aluminum foil. In some embodiments, the outer shell is made of a metal such as aluminum or an aluminum alloy, or a laminate film.

Outer shells made of metal may have, for example, but are not limited to, a sealed-up structure formed by welding the metal by laser welding, resistance welding, or ultrasonic welding or a caulking structure using the metal via a resin gasket. Outer shells made of a laminate film may have, for example, but are not limited to, a sealed-up structure formed by hot-melting the resin layers. In order to improve the sealability, a resin which is different from the resin of the laminate film may be disposed between the resin layers. In the case of forming a sealed-up structure by hot-melting the resin layers via current-collecting terminals, metal and resin are to be bonded. Therefore, the resin to be disposed between the resin layers may be a resin having a polar group or a modified resin having a polar group introduced thereinto. In addition, the outer shell may have any shape, for example, may be cylindrical, square, laminated, button-type, or large-sized.

Protection Element

The protection element may be a positive temperature coefficient (PTC) device, temperature fuse or thermistor whose resistance increases when abnormal heat generation occurs or an excessively large current flows, or a valve (current cut-off valve) which cuts off the current flowing in the circuit by abruptly increasing the battery internal pressure or internal temperature during abnormal heat generation. The above protection element may be an element that does not work during normal use at high current, and may also be designed to prevent abnormal heat generation or thermal runaway even if there is no protection element.

VI. Application

The electrochemical device of the present application includes any device where an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery.

The present application further provides an electronic device including an electrochemical device according to the present application.

The use of the electrochemical device of the present application is not particularly limited and can be used in any electronic device known in the art. In some embodiments, the electrochemical device according to the present application is applicable to, without limitation, notebook computers, pen-input computers, mobile computers, e-book players, portable phones, portable fax machines, portable copiers, portable printers, head-mounted stereo headphones, video recorders, LCD TVs, portable cleaners, portable CD players, minidisc players, transceivers, electronic notebooks, calculators, memory cards, portable recorders, radios, backup power sources, motors, vehicles, motorcycles, scooters, bicycles, lighting apparatus, toys, game consoles, clocks, electric tools, flash lights, cameras, large batteries for household use, and lithium ion capacitors.

Hereinafter, a lithium ion battery is taken as an example and the preparation of a lithium ion battery is described in conjunction with specific embodiments. Those skilled in the art will understand that the preparation methods described in the present application are merely exemplary, and any other suitable preparation methods also fall within the protection scope of the present application.

EXAMPLES

The performance evaluation of the lithium ion batteries in the examples of the present application and comparative examples is described below.

I. Preparation of Lithium-Ion Battery

1. Preparation of Anode:

Artificial graphite, styrene-butadiene rubber, and carboxymethyl cellulose sodium were mixed at a mass ratio of 96%:2%:2% with deionized water, and then a polymer compound having Si—C and Si—O bonds was added and stirred evenly to obtain an anode slurry. A 12 μm copper foil was coated with the anode slurry, dried, cold-pressed, and then subjected to slice cutting and tab welding to obtain an anode.

The polymer compounds having Si—C and Si—O bonds used in the following examples were as follows:

| Polymer compound having Si—C and Si—O bonds | Name (product name) |
| --- | --- |
| Compound 1 | Trisiloxane surfactant (CAS No. 3390-61-2; 28855-11-0) |
| Compound 2 | Silicone surfactant (Sylgard 309) |
| Compound 3 | Hydroxy-terminated polydimethylsiloxane (PMX-0156) |
| Compound 4 | N-β-(aminoethyl)-γ-aminopropyl methyl dimethoxysilane (KH-602) |
| Compound 5 | Dimethicone (CAS No. 63148-62-9) |

2. Preparation of Cathode:

$LiCoO_2$, conductive material (Super-P) and polyvinylidene fluoride (PVDF) were mixed at a mass ratio of 95%:2%:3% with N-methylpyrrolidone (NMP), and stirred evenly to obtain a cathode slurry. 12 μm aluminum foil was coated with the cathode slurry, dried, cold-pressed, and then subjected to slice cutting and tab welding to obtain a cathode.

(3) Preparation of Electrolyte

Under a dry argon atmosphere, EC, PC and DEC were mixed (at a weight ratio of 1:1:1), and $LiPF_6$ was added and mixed evenly to form a base electrolyte, where the concentration of $LiPF_6$ was 1.15 mol/L. Different amounts of additive were added to the base electrolyte to obtain electrolytes of different examples and comparative examples. Abbreviations and names of components in the electrolyte are as shown in the following table:

| Material name | Abbreviation | Material name | Abbreviation |
| --- | --- | --- | --- |
| ethylene carbonate | EC | propylene carbonate | PC |
| ethyl methyl carbonate | EMC | ethyl propionate | EP |
| propyl propionate | PP | γ-butyrolactone | GBL |
| butanedinitrile | SN | adiponitrile | ADN |
| diethylene glycol bis(2-cyanoethyl) ether | EDN | 1,3,6-hexanetricarbonitrile | HTCN |
| 1,2,3-tris(2-cyanoethoxy)propane | TCEP | lithium difluorophosphate | $LiPO_2F_2$ |

(4) Preparation of Separator

A polyethylene (PE) porous polymer film was used as a separator.

(5) Preparation of Lithium Ion Battery

The obtained cathode, anode and separator were wound in order, and placed in an outer packaging foil, leaving a liquid injection port. The lithium-ion battery was obtained by injecting the electrolyte into the liquid injection port, performing packaging, and then performing processes such as formation and capacity.

II. Test Methods

1. Test Method for Capacity Retention Rate After Cycling of Lithium-Ion Battery

At 45° C., the lithium-ion battery was charged at a constant current of 1 C to 4.45 V, then charged at a constant voltage of 4.45 V to a current of 0.05 C, and discharged at a constant current of 1 C to 3.0 V, which was the first cycle. The lithium-ion battery was cycled 200 times in accordance with the above conditions. "1 C" is the current value that completely discharges the battery capacity within 1 hour.

The capacity retention rate after the cycling of the lithium-ion battery was calculated by the following formula:

Capacity retention ratio after cycle=(discharge capacity after cycle/discharge capacity of first cycle)×100%.

5. Test Method for Direct Current Resistance (DCR) of Lithium-Ion Battery

At 25° C., the lithium-ion battery was charged at a constant current of 1.5 C to 4.45 V, then charged at a constant voltage of 4.45 V to 0.05 C, and allowed to stand for 30 minutes. Then the lithium-ion battery was discharged at 0.1 C for 10 s (sampled once every 0.1 s to record the corresponding voltage U1), and then discharged at 1 C for 360 s (sampled once every 0.1 s to record the corresponding voltage U2). The charging and discharging procedure was repeated 5 times. "1 C" is the current value that completely discharges the battery capacity within 1 hour.

The DCR of the lithium-ion battery is calculated according to the following equation:

DCR=(U2−U1)/(1C−0.1C).

The DCR in the present application is a value at 50% SOC (state of charge).

III. Test Results

Table 1 shows the influence of the polymer compound having Si—C and Si—O bonds on the capacity retention rate after cycling and the direct current resistance (DCR) of the lithium-ion battery.

TABLE 1

|  | Compound | Content (ppm) | Capacity retention rate after cycle | DCR (mΩ) |
|---|---|---|---|---|
| Comparative Example 1 | / | / | 55% | 77 |
| Example 1 | Compound 1 | 500 | 77.9% | 62 |
| Example 2 | Compound 1 | 300 | 78.2% | 61 |
| Example 3 | Compound 1 | 1000 | 85.4% | 54 |
| Example 4 | Compound 1 | 3000 | 78.3% | 59 |
| Example 5 | Compound 1 | 5000 | 67.2% | 68 |
| Example 6 | Compound 2 | 500 | 78% | 61 |
| Example 7 | Compound 3 | 500 | 77.5% | 63 |
| Example 8 | Compound 4 | 500 | 76.4% | 63 |
| Example 9 | Compound 5 | 500 | 75.7% | 65 |
| Example 10 | Compound 5 | 3000 | 78.4% | 57 |

The results show that the addition of the polymer compound having Si—C and Si—O bonds into the anode mixture layer can improve the interface stability of the anode mixture layer, thereby significantly improving the capacity retention rate after cycling of the lithium-ion battery, and reducing the direct current resistance (DCR) of the lithium-ion battery.

Table 2 shows the influence of the surface tension of the polymer compound having Si—C and Si—O bonds on the capacity retention rate after cycling and the direct current resistance (DCR) of the lithium-ion battery.

TABLE 2

|  | Compound | Content (ppm) | Surface tension (mN/m) | Capacity retention rate after cycle | DCR (mΩ) |
|---|---|---|---|---|---|
| Comparative Example 2 | Peregal | 1000 | 42.9 | 61.2% | 65 |
| Example 3 | Compound 1 | 1000 | 19.4 | 85.4% | 54 |
| Example 11 | Compound 2 | 1000 | 24.5 | 84.3% | 56 |
| Example 12 | Compound 5 | 1000 | 21.4 | 88.4% | 57 |

The results show that the surface tension of the polymer compound having Si—C and Si—O bonds can reflect the influence of the compound on the cycle and storage performance of the lithium-ion battery. When the surface tension of a 0.1 wt % aqueous solution of the polymer compound having Si—C and Si—O bonds is not greater than 30 mN/m, the capacity retention rate after cycling of the lithium-ion battery is significantly improved and the direct current resistance (DCR) of the lithium-ion battery is significantly reduced.

Table 3 shows the influence of the carbon material in the anode mixture layer on the capacity retention rate after cycling and the direct current resistance (DCR) of the lithium-ion battery. Except for the parameters listed in Table 3, all settings of the examples are the same as those of Example 1.

TABLE 3

|  | Specific surface area (m²/g) | D50 (μm) | Having amorphous carbon on the surface | Capacity retention rate after cycle | DCR (mΩ) |
|---|---|---|---|---|---|
| Example 1 | 5 | 20 | No | 77.9% | 62 |
| Example 13 | 3 | 20 | No | 83.2% | 58 |
| Example 14 | 3 | 15 | No | 83.8% | 57 |
| Example 15 | 3 | 10 | No | 84.5% | 56 |
| Example 16 | 3 | 10 | Yes | 85.7% | 48 |
| Example 17 | 1.5 | 20 | Yes | 83.8% | 53 |
| Example 18 | 1.2 | 15 | Yes | 84.6% | 52 |
| Example 19 | 1.5 | 10 | Yes | 83.4% | 51 |
| Example 20 | 3 | 5 | No | 73.1% | 67 |
| Example 21 | 3 | 30 | No | 75.7% | 65 |
| Example 22 | 3 | 50 | No | 70.1% | 72 |
| Example 23 | 10 | 50 | No | 68.1% | 87 |

As shown in Table 3, the carbon material in the anode mixture layer has the following characteristics: a specific surface area of less than 5 m²/g; a median particle size of 5 μm to 30 μm; and/or amorphous carbon on the surface. When the carbon material in the anode mixture layer has the above characteristics, the capacity retention rate after cycling and the direct current resistance (DCR) of the lithium-ion battery can be further improved.

Table 4 shows the influence of the characteristics of the anode mixture layer on the capacity retention rate after cycling and the direct current resistance (DCR) of the lithium-ion battery. Except for the parameters listed in Table 4, all settings of the examples are the same as those of Example 1.

TABLE 4

|  | Thickness of anode mixture layer (μm) | Porosity of anode mixture layer | Height for ball impact (cm) | Capacity retention rate after cycle | DCR (mΩ) |
|---|---|---|---|---|---|
| Example 1 | 120 | 20% | 50 | 77.9% | 62 |
| Example 24 | 200 | 20% | 30 | 62.3% | 78 |

TABLE 4-continued

| | Thickness of anode mixture layer (μm) | Porosity of anode mixture layer | Height for ball impact (cm) | Capacity retention rate after cycle | DCR (mΩ) |
|---|---|---|---|---|---|
| Example 25 | 200 | 40% | 30 | 65.7% | 73 |
| Example 26 | 200 | 40% | 50 | 72.4% | 66 |
| Example 27 | 120 | 40% | 50 | 83.5% | 57 |
| Example 28 | 100 | 20% | 60 | 86.4% | 55 |
| Example 29 | 100 | 20% | 80 | 86.3% | 56 |
| Example 30 | 100 | 20% | 100 | 87.1% | 55 |
| Example 31 | 300 | 20% | 50 | 66.3% | 82 |
| Example 32 | 120 | 10% | 50 | 64.9% | 78 |
| Example 33 | 120 | 60% | 50 | 68.9% | 71 |
| Example 34 | 120 | 70% | 50 | 61.9% | 89 |
| Example 35 | 300 | 70% | 30 | 58.9 | 73 |

As shown in Table 4, the anode mixture layer has the following characteristics: a thickness of not greater than 200 μm; a porosity of 10% to 60%; and/or a height for ball impact of at least 50 cm (where the height is a minimum height from which a ball having a diameter of 15 mm and a weight of 12 g falls onto the anode mixture layer to cause the formation of cracks on the anode mixture layer). When the anode mixture layer has the above characteristics, the capacity retention rate after cycling and the direct current resistance (DCR) of the lithium-ion battery can be further improved.

Table 5 shows the influence of the components of the electrolyte on the capacity retention rate after cycling and the direct current resistance (DCR) of the lithium-ion battery. Except for the parameters listed in Table 5, all settings of the examples are the same as those of Example 1.

TABLE 5

| | Propionate (20 wt %) | Organic compound having a cyano group (2 wt %) | $LiPO_2F_2$ (0.5 wt %) | Compound of Formula 1 (1 wt %) | Capacity retention rate after cycle | DCR (mΩ) |
|---|---|---|---|---|---|---|
| Example 1 | / | / | / | / | 77.9% | 62 |
| Example 36 | PP | / | / | / | 83.4% | 57 |
| Example 37 | EP | / | / | / | 82.7% | 55 |
| Example 38 | / | ADN | / | / | 84.2% | 65 |
| Example 39 | / | SN | / | / | 84.3% | 66 |
| Example 40 | / | HTCN | / | / | 85.1% | 64 |
| Example 41 | / | EDN | / | / | 86.3% | 62 |
| Example 42 | / | / | $LiPO_2F_2$ | / | 87.4% | 55 |
| Example 43 | / | / | / | Formula 1-1 | 88.3% | 53 |
| Example 44 | / | / | / | Formula 1-2 (p = 1) | 88.7% | 54 |
| Example 45 | / | / | / | Formula 1-4 | 89.1% | 54 |
| Example 46 | PP | ADN | / | / | 85.6% | 60 |
| Example 47 | PP | SN | / | / | 85.8% | 61 |
| Example 48 | PP | HTCN | / | / | 86.5% | 59 |
| Example 49 | PP | EDN | / | / | 86.1% | 57 |
| Example 50 | PP | TCEP | / | / | 88.2% | 55 |
| Example 51 | PP | / | $LiPO_2F_2$ | / | 89.4% | 51 |
| Example 52 | PP | / | / | Formula 1-1 | 89.7% | 50 |
| Example 53 | PP | / | / | Formula 1-2 (p = 1) | 90.3% | 49 |
| Example 54 | PP | / | / | Formula 1-4 | 91% | 48 |
| Example 55 | / | HTCN | $LiPO_2F_2$ | / | 91.3% | 57 |
| Example 56 | / | HTCN | / | Formula 1-1 | 90.7% | 56 |
| Example 57 | / | HTCN | / | Formula 1-2 (p = 1) | 91.2% | 55 |
| Example 58 | / | HTCN | / | Formula 1-4 | 91.3% | 54 |
| Example 59 | / | TCEP | / | Formula 1-1 | 91.5% | 54 |
| Example 60 | / | TCEP | / | Formula 1-2 (p = 1) | 92.3% | 53 |
| Example 61 | / | TCEP | / | Formula 1-4 | 93% | 50 |
| Example 62 | PP | TCEP | $LiPO_2F_2$ | / | 95% | 43 |
| Example 63 | PP | TCEP | $LiPO_2F_2$ | Formula 1-4 | 97% | 40 |

The results show that with the use of the anode mixture layer of the present application, when the electrolyte includes propionate, the organic compound having a cyano group(s), lithium difluorophosphate, and/or the compounds of Formula 1, the interface stability of the anode mixture layer is further improved, so that the capacity retention rate after cycling and the direct current resistance (DCR) of the lithium-ion battery are significantly improved.

Throughout the specification, references to "embodiment", "part of the embodiments", "one embodiment", "another example", "example", "specific example" or "part of the examples" mean that at least one embodiment or example of the present application includes specific features, structures, materials or characteristics described in the embodiment or example. Thus, the descriptions which appear throughout the specification, such as "in some embodiments", "in an embodiment", "in one embodiment", "in another example", "in one example", "in a specific example" or "an example", do not necessarily refer to the same embodiment or example in the present application. Furthermore, the particular features, structures, materials or characteristics herein may be combined in any suitable manner in one or more embodiments or examples.

Although illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising:
   a cathode;
   an anode; and
   an electrolyte,
   wherein the anode comprises an anode mixture layer disposed on an anode current collector, the anode mixture layer comprises a carbon material as an anode active material, at least a part of a surface of the anode mixture layer or a surface of the carbon material comprises a polymer compound having Si—C and Si—O bonds, and a surface tension of an aqueous solution containing 0.1 wt % of the polymer compound having Si—C and Si—O bonds being not greater than 30 mN/m,
   wherein the polymer compound having Si—C and Si—O bonds has an oxidation potential of not less than 4.5 V and a reductive potential of not greater than 0.5 V;
   wherein the carbon material has at least one of the following characteristics:
   (a) a specific surface area of less than 5 m²/g,
   (b) a median particle size of 5 μm to 30 μm, or
   (c) amorphous carbon on a surface of the carbon material;
   wherein the anode mixture layer has at least one of the following characteristics:
   (i) a thickness of not greater than 200 μm,
   (ii) a porosity of 10% to 60%, or
   (iii) a minimum height from which a ball having a diameter of 15 mm and a weight of 12 g falls onto the anode mixture layer to cause formation of cracks on the anode mixture layer being at least 50 cm;
   wherein the polymer compound having Si—C and Si—O bonds comprises at least one of trisiloxane surfactant, silicone surfactant, hydroxy-terminated polydimethylsiloxane, N-β-(aminoethyl)-γ-aminopropyl methyl dimethoxysilane, or dimethicone;
   wherein the electrolyte comprises propionate, lithium difluorophosphate,
   an organic compound having a cyano group, and a compound of Formula 1, the organic compound having the cyano group comprising 1,2,3-tris(2-cyanoethoxy)propane, the compound of Formula 1 is at least one selected from the group consisting of:

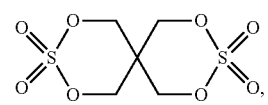

Formula 1-1

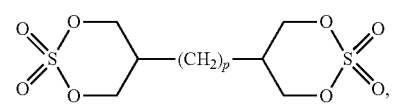

Formula 1-2

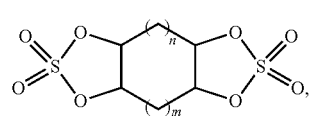

Formula 1-3

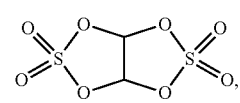

Formula 1-4

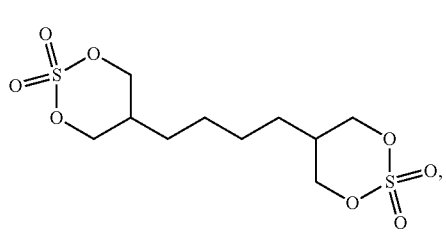

Formula 1-5

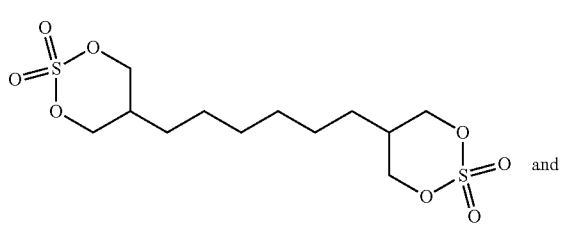

Formula 1-6 and

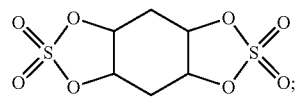

Formula 1-7 m is an integer from 1 to 4;
n is an integer from 0 to 2;
p is an integer from 0 to 6; and
wherein based on the total weight of the electrolyte, the content of the organic compound having the cyano group is 0.1 wt % to 15 wt %.

2. The electrochemical device according to claim 1, wherein the polymer compound having Si—C and Si—O bonds comprises polyether siloxane.

3. The electrochemical device according to claim 1, wherein based on a total weight of the anode mixture layer, a content of the polymer compound having Si—C and Si—O bonds is less than or equal to 3000 ppm.

4. The electrochemical device according to claim 1, wherein the propionate has a structure of Formula 2:

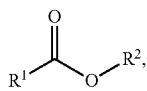

Formula 2 wherein
$R^1$ is selected from ethyl or haloethyl, and
$R^2$ is selected from $C_1$-$C_6$ alkyl or $C_1$-$C_6$ haloalkyl; and based on the weight of the electrolyte, a content of the propionate is 10 wt %- 65 wt %,
wherein the propionate is selected from at least one of: methyl propionate, ethyl propionate, propyl propionate, butyl propionate, or amyl propionate.

5. An electronic device, comprising an electrochemical device, the electrochemical device comprises:
a cathode;
an anode; and
an electrolyte,
wherein the anode comprises an anode mixture layer disposed on an anode current collector, the anode mixture layer comprises a carbon material as an anode active material, at least a part of a surface of the anode mixture layer or a surface of the carbon material comprises a polymer compound having Si—C and Si—O bonds, and a surface tension of an aqueous solution containing 0.1 wt % of the polymer compound having Si—C and Si—O bonds being not greater than 30 mN/m,
wherein the polymer compound having Si—C and Si—O bonds has an oxidation potential of not less than 4.5 V and a reductive potential of not greater than 0.5 V;
wherein the carbon material has at least one of the following characteristics:
(a) a specific surface area of less than 5 m²/g,
(b) a median particle size of 5 μm to 30 μm, or
(c) amorphous carbon on a surface;
wherein the anode mixture layer has at least one of the following characteristics:
(i) a thickness of not greater than 200 μm,
(ii) a porosity of 10% to 60%, or
(iii) a minimum height from which a ball having a diameter of 15 mm and a weight of 12 g falls onto the anode mixture layer to cause formation of cracks on the anode mixture layer being at least 50 cm;
wherein the polymer compound having Si—C and Si—O bonds comprises at least one of trisiloxane surfactant, silicone surfactant, hydroxy-terminated polydimethylsiloxane, N-β-(aminoethyl)-γ-aminopropyl methyl dimethoxysilane, or dimethicone;
wherein the electrolyte comprises propionate, lithium difluorophosphate, an organic compound having a cyano group, and a compound of Formula 1,
the organic compound having the cyano group comprising 1,2,3-tris (2-cyanoethoxy) propane, the compound of Formula 1 is at least one selected from the group consisting of:

Formula 1-1

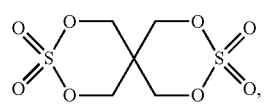

Formula 1-2

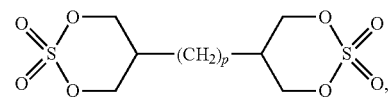

Formula 1-3

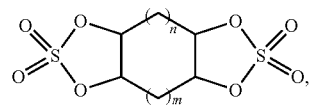

Formula 1-4

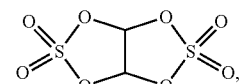

Formula 1-5

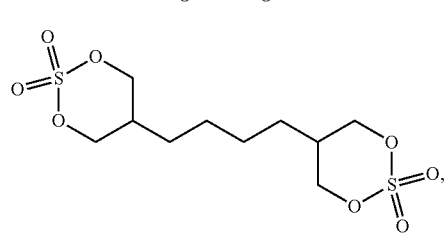

Formula 1-6

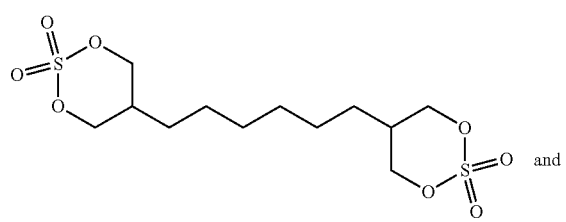

and

Formula 1-7

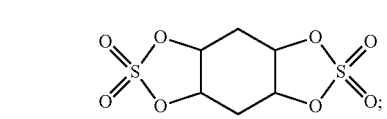

m is an integer from 1 to 4;
n is an integer from 0 to 2; and
p is an integer from 0 to 6; and
wherein based on the total weight of the electrolyte, the content of the organic compound having the cyano group is 0.1 wt % to 15 wt %.

6. The electronic device according to claim 5, wherein the polymer compound having Si—C and Si—O bonds comprises polyether siloxane.

7. The electronic device according to claim 5, wherein based on a total weight of the anode mixture layer, a content of the polymer compound having Si—C and Si—O bonds is less than or equal to 3000 ppm.

8. The electronic device according to claim 5, wherein the propionate has a structure of Formula 2:

Formula 2

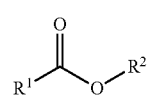

wherein
$R^1$ is selected from ethyl or haloethyl, and
$R^2$ is selected from $C_1$-$C_6$ alkyl or $C_1$-$C_6$ haloalkyl; and based on the weight of the electrolyte, a content of the propionate is 10 wt %- 65 wt %, wherein the propionate is selected from at least one of: methyl propionate, ethyl propionate, propyl propionate, butyl propionate, or amyl propionate.

9. The electronic device according to claim 5, wherein as measured using a contact angle measurement method, a contact angle of the anode mixture layer relative to a non-aqueous solvent is not greater than 60°.

10. The electrochemical device according to claim 1, wherein as measured using a contact angle measurement method, a contact angle of the anode mixture layer relative to a non-aqueous solvent is not greater than 60°.

* * * * *